US009014135B2

(12) United States Patent
Yu et al.

(10) Patent No.: US 9,014,135 B2
(45) Date of Patent: Apr. 21, 2015

(54) METHODS AND APPARATUS FOR LINK ADAPTATION FOR SINGLE USER AND MULTI-USER MIMO

(75) Inventors: Ping Yu, Ottawa (CA); Girum Alebachew Fantaye, Kista (SE); Xixian Chen, Ottawa (CA); Hong Ren, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 579 days.

(21) Appl. No.: 13/342,650

(22) Filed: Jan. 3, 2012

(65) Prior Publication Data

US 2013/0170469 A1 Jul. 4, 2013

(51) Int. Cl.
*H04W 72/04* (2009.01)
*H04L 1/00* (2006.01)
(Continued)

(52) U.S. Cl.
CPC ............ *H04L 1/0003* (2013.01); *H04L 1/0009* (2013.01); *H04L 1/0015* (2013.01); *H04L 5/0023* (2013.01); *H04L 5/0037* (2013.01);
(Continued)

(58) Field of Classification Search
CPC .............. H04L 12/5602; H04L 47/10; H04L 2012/5636; H04L 2012/5632; H04L 43/50; H04L 43/0852; H04L 43/08; H04L 2012/5679; H04L 47/50; H04L 47/622; H04L 29/06163; H04L 1/0001; H04L 13/00; H04L 13/04; H04W 72/04; H04W 72/08; H04W 74/00; H04W 74/04; H04W 74/08
USPC ......... 370/232, 252, 465, 468, 479, 335, 342, 370/395.4, 330, 779
See application file for complete search history.

(56) References Cited

U.S. PATENT DOCUMENTS 7,206,332 B2 *  4/2007  Kwan et al. ................... 375/140
8,687,541 B2 *  4/2014  Lohr et al. ..................... 370/318
(Continued)

FOREIGN PATENT DOCUMENTS

EP       1 024 622 A2     8/2000

OTHER PUBLICATIONS

3GPP TS 36.213,LTE; Evolved Universal Terrestrial Radio Access (E-UTRA); Physical Layer procedures; V8.8.0 Release 8, (Oct. 2009).

(Continued)

*Primary Examiner* — Kwang B Yao
*Assistant Examiner* — Syed M Bokhari
(74) *Attorney, Agent, or Firm* — Myers Bigel Sibley & Sajovec, P.A.

(57) ABSTRACT

Methods of performing link adaptation in a wireless communication system for simultaneous transmission of codewords include selecting initial modulation and coding scheme (MCS) levels for the codewords, estimating a size ratio of the codewords, determining a number of scheduling blocks (SB) for the codewords with the initial MCS levels, and determining revised MCS levels for the codewords in response to the determined number of SBs. Transport block sizes are computed for the codewords, and it is determined if there is a need to increase the number of scheduling blocks in at least one of the codewords. If there is a need to increase the number of scheduling blocks in a codeword, scheduling blocks are added to the codeword, and the transport block size for the codeword is recomputed. The codewords are then simultaneously transmitted over different multiple input-multiple output (MIMO) communication channels using the same time and frequency resources.

16 Claims, 11 Drawing Sheets

(51) Int. Cl.
*H04L 5/00* (2006.01)
*H04W 28/06* (2009.01)

(52) U.S. Cl.
CPC ............ *H04L 5/0042* (2013.01); *H04L 5/0046* (2013.01); *H04W 28/06* (2013.01)

(56) References Cited

U.S. PATENT DOCUMENTS

| | | | |
|---|---|---|---|
| 2009/0052473 A1* | 2/2009 | Choi et al. ................... | 370/498 |
| 2011/0085508 A1* | 4/2011 | Wengerter et al. ........... | 370/329 |
| 2011/0194517 A1* | 8/2011 | Nagata et al. ................ | 370/329 |
| 2011/0211488 A1* | 9/2011 | Kwon et al. .................. | 370/252 |
| 2011/0299466 A1* | 12/2011 | Ofuji et al. ................... | 370/328 |
| 2012/0099548 A1* | 4/2012 | Yan et al. ..................... | 370/329 |
| 2012/0207117 A1* | 8/2012 | Malkamaki et al. .......... | 370/329 |
| 2014/0133437 A1* | 5/2014 | Papasakellariou ............ | 370/329 |

OTHER PUBLICATIONS

Dahlman, E. et al., "Key features of the LTE radio interface", *Ericsson Review No. 2*, 2008.

Duplicy, J. et al., "MU-MIMO in LTE Systems", *EURASIP Journal on Wireless Communications and Networking*, vol. 2011, Article ID 496763, 13 Pages.

Freescale Semiconductor, "Long Term Evolution Protocol Overview", White Paper, Document No. LTEPTCLOVWWP, Rev 0 Oct. 2008; Accessed Nov. 16, 2011, http://www.freescale.com/files/wireless_comm/doc/white_paper/LTEPTCLOVWWP.pdf.

Kwan, R. et al., "A Survey of Scheduling and Interference Mitigation in LTE", *Journal of Electrical and Computer Engineering*, vol. 2010, Article ID 273486, 10 Pages.

Motorola, "Long Term Evolution (LTE): Overview of LTE Air-Interface", Technical White Paper, Accessed Nov. 16, 2011, http://business.motorola.com/experiencelte/pdf/LTEAirInterfaceWhitePaperpdf.

Parkvall, Dr. Stefan, "3G Evolution—HSPA and LTE for Mobile Broadband", Chapter 7—Scheduling, Link Adaptation and Hybrid ARQ, Feb. 29, 2008, 27 Pages.

Rohde & Schwarz, "UMTS Long Term Evolution (LTE) Technology Introduction", Sep. 2008, http://www2.rohde-schwarz.com/file_10948/1MA111_2E.pdf.

Tian, R. "Scheduling, Link adaption and Hybrid ARQ", Chapter 7, *3G Evolution—HSPA and LTE for Mobile Broadband*, Apr. 2, 2009, 10 Pages.

Whitacre, J. "A Primer on MIMO in LTE", *Hearst Electronic Products*, Feb. 1, 2010, 4 Pages.

Wikipedia, "Link adaptation", accessed Aug. 7, 2012; http://en.wikipedia.org/wiki/Link_adaptation.

Texas Instruments, "Consideration of Supportable TF for E-UTRA DL", 3GPP TSG RAN WG1 51bis, R1-080187; Sevilla, Spain, Jan. 14-18, 2008, 6 Pages.

Notification to Pay Additional Fees Corresponding to International Application No. PCT/IB2013/000001; Date of Mailing: Jul. 31, 2013; 7 Pages.

International Search Report and Written Opinion Corresponding to International Application No. PCT/IB2013/000001; Date of Mailing: Sep. 20, 2013; 20 Pages.

* cited by examiner

METHODS AND APPARATUS FOR LINK ADAPTATION FOR SINGLE USER AND MULTI-USER MIMO

FIELD

The present inventive concept relates to wireless communication systems, and in particular relates to link adaptation in wireless communication systems that employ multiple input-multiple output (MIMO) communication channels.

BACKGROUND

In a typical cellular radio system, wireless terminals (also known as mobile stations and/or user equipment units (UEs)) communicate via a radio access network (RAN) to one or more core networks. User equipment units (UE) may include mobile telephones ("cellular" telephones) and/or other processing devices with wireless communication capability, such as, for example, portable, pocket, hand-held, laptop computers, which communicate voice and/or data with the RAN.

The RAN covers a geographic area which is divided into cell areas, with each cell area being served by a base station, e.g., a radio base station (RBS), which in some networks is also called a "NodeB" or enhanced NodeB (eNodeB or eNB). A cell is a geographical area where radio coverage is provided by the radio base station equipment at a base station site. The base stations communicate over the air interface operating on radio frequencies with UEs within range of the base stations.

FIG. 1 is a simplified block diagram of a Long Term Evolution (LTE) RAN 100. The LTE RAN 100 is a variant of a Third Generation Partnership Project (3GPP) RAN in which radio base station nodes (eNodeBs) are connected directly to a core network 130 rather than to radio network controller nodes. In general, in LTE the functions of a radio network controller node are performed by the radio base stations nodes. Each of the radio base station nodes (eNodeBs) 122-1, 122-2, . . . 122-M communicate with UEs (e.g., UE 110-1, 110-2, 110-3, 110-L) that are within their respective communication service cells. The radio base station nodes (eNodeBs) can communicate with one another through an X2 interface and with the core network 130 through S1 interfaces, as is well known in the art.

The LTE standard is based on multi-carrier based radio access schemes, such as Orthogonal Frequency-Division Multiple Access (OFDMA), in the downlink (base station to UE direction) and single carrier (SC)-FDMA in the uplink (UE to base station direction).

The spread spectrum technique used in orthogonal frequency-division multiplexing (OFDM) distributes the data to be transmitted over a large number of closely spaced orthogonal sub-carriers. The data is divided into several parallel data streams or channels, one for each sub-carrier. Each sub-carrier is modulated with a conventional modulation scheme (such as quadrature amplitude modulation or phase-shift keying) at a low symbol rate.

Because the sub-carriers are orthogonal to each other, cross-talk between the sub-channels is greatly reduced and inter-carrier guard bands are not required, which simplifies the design of both the transmitter and the receiver, as a separate filter is not required for each sub-channel. The benefits of OFDM are high spectral efficiency, resiliency to RF interference, and lower multi-path distortion.

Data transmission in an LTE system is organized in a sequence of frames. An LTE frame is ten milliseconds in duration and includes ten 1 ms subframes. Each subframe is composed of two 0.5 ms slots. The LTE frame structure is illustrated in FIG. 2A. An LTE frame can include both downlink portion(s) and uplink portion(s) that are communicated between the base station and UEs.

FIG. 2B illustrates a resource grid for frequency and time resource elements 135, where frequency subcarriers (e.g., each having 15 kHz frequency bandwidth) can be assigned to a plurality of UEs for transmitting and/or receiving data with an associated radio base station node eNodeB during assigned slots. A Resource Element (RE) 135 is one 15 kHz subcarrier for the duration of one symbol (66.7 μs).

FIG. 2C illustrates a resource block (RB). A resource block 137 is a group of 12 adjacent subcarriers for a duration of 1 slot (0.5 ms, or one half a sub-frame), or seven symbols. Also illustrated in FIG. 2C is a Scheduling Block (SB), which includes two consecutive resource blocks RB. A scheduling block SB spans one transmission time interval (TTI) or 1 ms and has a bandwidth of 180 kHz. A scheduling block SB occupies 168 resource elements (REs) within the 180 kHz bandwidth. The scheduling block SB is the smallest resource unit that a resource scheduler can allocate to a user.

One or more resource schedulers in the LTE RAN 100 assign the REs for downlink communications (e.g., the downlink shared channel (DL-SCH)) and for uplink communications (e.g., the uplink shared channel (UL-SCH)). The assignments for downlink shared channel (DL-SCH) and uplink shared channel (UL-SCH) are transmitted in a few OFDM symbols at the beginning of each downlink subframe.

Typically, wireless communication channels change with time, due, for example to motion of a UE, changing environmental conditions, etc. In order to maximize throughput of a wireless channel, a transmitter and/or a receiver can estimate the channel characteristics and adapt the transmission and/or reception of signals to account for changes in the channel. Link adaptation refers to the use of adaptive modulation and coding (AMC) to match the modulation, coding and other signal and protocol parameters to the conditions on the radio link (e.g. the path loss, the interference due to signals coming from other transmitters, the sensitivity of the receiver, the available transmitter power margin, etc.). Stated differently, link adaptation uses a rate adaptation algorithm that adapts the modulation and coding scheme (MCS) that is used for a particular transmission according to the quality of the radio channel.

In general, LTE downlink data scheduling and link adaptation require intensive computations in order to achieve high throughputs, effective physical resource usage, and/or high capacity of number of scheduled UEs.

Data throughput, or transmission capacity, can also be increased through the use of multiple transmitters/receivers at one or both terminals. MIMO (for multiple input/multiple output) refers to the use of multiple transmitters/receivers at both terminals, such as an eNodeB 122 and a UE 110, as illustrated in FIG. 2D. In MIMO, both transmitters can transmit independent data streams using the same transmission resources (in time and frequency). Using channel estimation techniques, each of the receivers can separate the data streams and demodulate the transmitted data.

A "codeword" represents user data before it is formatted for transmission. One or two codewords, CW0 and/or CW1, can be used depending on the channel conditions and transmission mode. In single-user MIMO (SU-MIMO), two code words are sent to a single UE. In multi-user MIMO (MU-MIMO), each code word may be sent to a different UE. In general, one codeword is equivalent to the data that can be transmitted in one transport block (TB). The size of a transport block can vary depending on the currently available resources in the UE and the eNodeB and based on the modulation and coding scheme that is used.

For MIMO, at least two data streams (referred to in LTE as "layers") must be used. Up to eight layers are defined for downlink MIMO in LTE Release 10. The number of layers used in a particular transmission is always less than or equal to the number of antennas.

Using MIMO technology for two codeword transmission can increase the downlink data throughput. However, using MIMO for downlink transmission requires more computing efforts in order to adapt each transport block to the associated channel quality in an efficient way.

The increased number of rules and metrics that should be considered by resource schedulers when scheduling downlink transmission resources has substantially increased their processing demands and challenged their ability to efficiently manage resource elements. The resource schedulers are further stressed by demands for dynamic decision making to provide high bit rate packet switched services simultaneously with providing delay sensitive services, such as voice calls, and to make these decisions while adjusting to changing radio conditions to provide increased air interface data capacity. Accordingly, there is a continuing need to develop improved resource schedulers and methods that can process increased numbers of scheduling rules and metrics to provide more efficient resource scheduling.

SUMMARY

Some embodiments of the invention provide methods of performing link adaptation in a wireless communication system for simultaneous transmission of first and second codewords over multiple input-multiple output (MIMO) communication channels. The methods selecting initial modulation and coding scheme (MCS) levels for the codewords, estimating a size ratio of the codewords, determining a number of scheduling blocks (SB) for the codewords with the initial MCS levels, and determining revised MCS levels for the codewords in response to the determined number of SBs. Transport block sizes are computed for the codewords, and it is determined if there is a need to increase the number of scheduling blocks in at least one of the codewords. If there is a need to increase the number of scheduling blocks in a codeword, scheduling blocks are added to the codeword, and the transport block size for the codeword is recomputed. The codewords are then simultaneously transmitted over different multiple input-multiple output (MIMO) communication channels using the same time and frequency resources.

Estimating the size ratio for the first and second codewords may include estimating a predicted throughput for each scheduling block and estimating data sizes for the first and second codewords in response to the predicted throughput for each scheduling block.

Estimating the predicted throughput for each scheduling block may include determining an average number of bits per scheduling block based on channel quality measurements.

Determining if there is a need to increase the number of scheduling blocks in at least one of the codewords may include comparing a sum of transport block sizes for the first and second codewords to a total size of data to be transmitted.

The methods may further include lowering the MCS levels for at least one of the codewords to reduce padding in the transport blocks.

The methods may further include lowering the MCS levels for at least one of the codewords to meet a code rate limit.

The methods may further include determining if there is a need to reduce the number of scheduling blocks in at least another of the first and second codewords, removing scheduling blocks from the at least another codeword in response to determining that there is a need to reduce the number of scheduling blocks in the at least another codeword, and re-computing the transport block for the at least another codeword.

Determining if there is a need to reduce the number of scheduling blocks in at least one of the codewords may include comparing a sum of transport block sizes for the first and second codewords to a padded size of data to be transmitted.

Selecting the initial MCS levels for the first and second codewords may include determining an aggregate channel quality measurement for each codeword and modulation scheme for an entire bandwidth of available scheduling blocks, and determining a highest possible MCS level for each codeword in response to the aggregate channel quality measurement.

Selecting the initial MCS levels for the first and second codewords may include selecting an initial number of scheduling blocks that is a minimum number based on downlink control information, generating an aggregate channel quality measurement as a sum of channel quality measurements for the selected scheduling blocks, and determining a highest possible MCS level for each codeword in response to the aggregate channel quality measurement.

Some further embodiments provide methods of performing link adaptation in a wireless communication system for simultaneous retransmission of first and second codewords over first and second multiple input-multiple output (MIMO) communication channels. The methods include determining transport block sizes for the first and second codewords used in an initial transmission of the first and second codewords, mapping the codeword with the larger transport block size to a MIMO communication channel of the first and second MIMO communication channels having the higher channel quality, selecting scheduling blocks for the first and second codewords, and determining modulation and coding scheme (MCS) levels for retransmission of the first and second codewords. The methods further include determining transport block sizes for retransmission of the first and second codewords, determining if there is a need to increase the number of scheduling blocks in at least one codeword of the first and second codewords, and adding scheduling blocks to the at least one codeword in response to determining that there is a need to increase the number of scheduling blocks in the at least one codeword. The transport block size for the at least one codeword is recomputed, and the first and second codewords are simultaneously transmitted over different MIMO communication channels using the same time and frequency resources.

The methods may further include determining if there is a need to reduce the number of scheduling blocks in at least another of the first and second codewords, removing scheduling blocks from the at least another codeword in response to determining that there is a need to reduce the number of scheduling blocks in the at least another codeword, and re-computing the transport block for the at least another codeword.

The methods may further include reducing the modulation and coding scheme level for at least one of the codewords until a lowest MCS level is found for which the transport block size is greater than the amount of data to be transmitted in the codeword.

Some further embodiments provide methods of performing link adaptation in a wireless communication system for simultaneous retransmission of an old codeword and transmission of a new codeword over first and second multiple input-multiple output (MIMO) communication channels. The methods include performing single codeword link adaptation for the old codeword, selecting a modulation and coding scheme (MCS) level for the new codeword, determining if a transport block size for the new codeword is less than a minimum transport block size, and in response, increasing the MCS level for the new codeword. The methods further include determining if the transport block size for the new codeword is greater than a size of data to be transmitted in the new codeword, and in response, decreasing the MCS level for the new codeword. The first and second codewords are simultaneously transmitted over different multiple input-multiple output (MIMO) communication channels using the same time and frequency resources.

The methods may further include adding scheduling blocks to the new codeword.

The methods may further include lowering the MCS level of the new codeword in response to determining that the transport block size for the new codeword is greater than a size of data to be transmitted in the new codeword.

The methods may further include lowering the MCS level of the new codeword to meet a code rate limitation.

A network node of a radio access network according to some embodiments includes a scheduler and a transmitter. The scheduler is configured to select initial modulation and coding scheme (MCS) levels for first and second codewords, estimate a size ratio of the first and second codewords, and determine a number of scheduling blocks for the first and second codewords with the initial modulation and coding schemes. The scheduler is further configured to determine revised MCS levels for the first and second codewords in response to the selected scheduling blocks, compute transport block sizes for the codewords in response to the revised modulation and coding schemes for the first and second codewords, determine if there is a need to increase the number of scheduling blocks in at least one codeword of the first and second of the codewords, and to add scheduling blocks to the at least one codeword in response to determining that there is a need to increase the number of scheduling blocks in the at least one codeword. The scheduler is further configured to re-compute the transport block for the at least one codeword. The transmitter is configured to simultaneously transmit the first and second codewords over different multiple input-multiple output (MIMO) communication channels using the same time and frequency resources.

A network node of a radio access network according to further embodiments includes a scheduler and a transmitter. The scheduler is configured to determine transport block sizes for first and second codewords used in an initial transmission of the first and second codewords, map the codeword with the larger transport block size to a MIMO communication channel of the first and second MIMO communication channels having the higher channel quality, select scheduling blocks for the first and second codewords, determine modulation and coding scheme (MCS) levels for retransmission of the first and second codewords, and determine transport block sizes for retransmission of the first and second codewords. The scheduler is further configured to determine if there is a need to increase the number of scheduling blocks in at least one codeword of the first and second codewords, add scheduling blocks to the at least one codeword in response to determining that there is a need to increase the number of scheduling blocks in the at least one codeword, and re-compute the transport block for the at least one codeword. The transmitter is configured to simultaneously re-transmit the first and second codewords over different MIMO communication channels using the same time and frequency resources.

A network node of a radio access network according to still further embodiments includes a scheduler and a transmitter. The scheduler is configured to perform single codeword link adaptation for a previously transmitted old codeword, select a modulation and coding scheme (MCS) level for a new codeword, determine if a transport block size for the new codeword is less than a minimum transport block size, and in response, increase the MCS level for the new codeword. The scheduler is further configured to determine if the transport block size for the new codeword is greater than a size of data to be transmitted in the new codeword, and in response, decrease the MCS level for the new codeword. The transmitter is configured to simultaneously transmit the old and new codewords over different multiple input-multiple output (MIMO) communication channels using the same time and frequency resources.

Other schedulers, network nodes, and/or methods according to embodiments of the invention will be or become apparent to one with skill in the art upon review of the following drawings and detailed description. It is intended that all such additional schedulers, network nodes, and/or methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
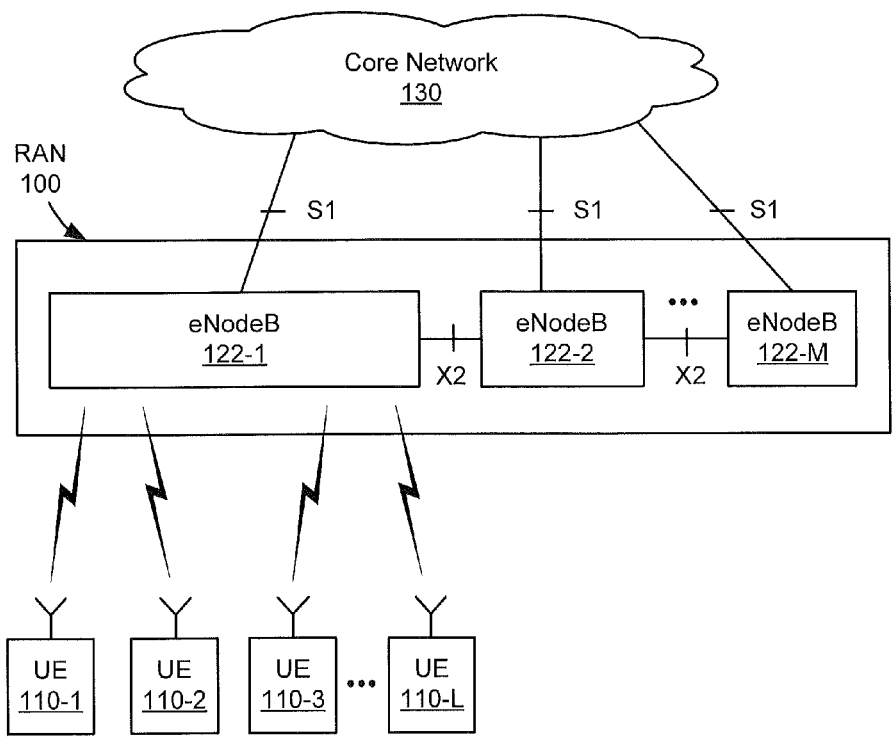
FIG. 1 is a block diagram of a conventional LTE radio access network.

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the term Radio Access Technology (RAT) may include, for example, operations in any of the following Radio Access Technologies: Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE (3rd Generation Partnership Project Long Term Evolution). Other Radio Access Technologies and/or frequency bands can also be used in embodiments according to the invention.

For purposes of illustration and explanation only, various embodiments of the present invention are described herein in the context of a resource scheduler that is operating in a LTE RAN, such as the RAN 100 of FIG. 1. It will be understood, however, that the present invention is not limited to such embodiments and may be embodied generally in any type of resource scheduler for a RAN that is configured to transmit and/or receive according to one or more radio access technologies. Although the resource schedulers are described as scheduling bandwidth resources, the resource schedulers are not limited thereto and may be used to schedule other types of resources, including, without limitation, transmission power on various defined carrier frequencies, etc.

For single UE MIMO, two-codeword transmissions can be used for the following situations:

[A] Both transport blocks are used for transmission of new data.

[B] Both transport blocks are for data retransmission as part of the same Hybrid Automatic Repeat-Request (HARQ) error control process.

[C] One transport block is used for data retransmission, and the other is used for new data transmission.

For LTE system, the following downlink transmission modes support the transmission of two transport blocks with different Modulation and Coding Schemes (MCS) depending on individual channel status:

[A] TM3—Transmission mode 3, open-loop spatial multiplexing;

[B] TM4—Transmission mode 4, closed-loop spatial multiplexing;

[C] TM8—Transmission mode 8, dual layer transmission, port 7 and 8;

[D.] TM9—Transmission mode 9, Up to 8 layer transmission, port 7—14.

Periodic channel status information (CSI) reports (mode 1-1) and aperiodic CSI reports (mode 3-1) can be used for transmission modes TM4, TM8 and TM9. Channel status information (CSI) refers to information provided in a channel status report provided by a UE to an eNodeB. Channel status information may include one or more items of information, including a channel quality indicator (CQI), which represents a recommendation of the modulation scheme and coding rate that should/can be used, a rank indication (RI or simply rank), which indicates the number of layers that should be used for downlink transmission, and/or precoder matrix information (PMI), which provides a precoder matrix recommended to be used for downlink transmission.

With these CSI report modes (1-1 and 3-1), if the rank is indicated as 2, wideband channel quality indicator (CQI) and/or subband CQIs are reported for each codeword.

Using this information, an eNodeB downlink scheduler can schedule two transport blocks with different sizes and assign a modulation and coding scheme (MCS) for each transport block according to their respective channel conditions.

For transmission mode TM3, periodic CSI reports (mode 1-0) and aperiodic CSI reports (mode 3-0) are normally used in which the two codewords share the same CQI information. However, the eNodeB can estimate individual channel conditions based on HARQ status for each codeword. The codeword based MCS can be adjusted to reach an expected block error rate (BLER) target.

Basic downlink link adaptation performed by the downlink scheduler at an eNodeB can be performed as follows:

[A] The UE reported wideband/subband CQIs are converted to associated signal to interference plus noise ratios (SINRs) with additional adjustments, such as filtering or outer loop adjustment.

[B] For each potentially available scheduling block (SB), codeword and modulation scheme, a channel quality measurement R[sb][mod][cw] that is associated with a particular scheduling block, modulation scheme and codeword is computed for a scheduling candidate UE for a given transmission time interval TTI. The computation is based on the adjusted SINR and actual resource elements used for downlink data transmission. The resulted measurement values are proportionally aligned to the throughput provided by the scheduling blocks allocated for the UE.

[C] The downlink scheduler determines the transport block size (TBS), identifies a set of allocated scheduling blocks, and determines the modulation and coding scheme for downlink data transmission based on a desired data size, the location of the SBs, the channel quality measurement associated with the SBs, the transmission mode and the downlink control information (DCI) format.

By using the channel quality measurement R[sb][mod][cw], it is possible to reuse a single codeword link adaptation algorithm for two-codeword transmission.

One solution for scheduling transmissions of two-codeword new data is to divide the data evenly in two regardless the channel conditions, then to use single codeword link adaptation for each codeword individually. A larger sized number of the scheduling blocks allocated for one of the two codewords is then used for both codewords. In this case, the codeword to be allocated on the worse channel could require more scheduling blocks than the codeword to be allocated to the better channel.

For scheduling data retransmission using two codewords, the same single codeword link adaptation used for new data transmission can be applied to each individual codeword, with the condition that the transport block size is no smaller than the transport block size used when the data was originally sent to the UE. As between the scheduling block sets selected from the two link adaptations, the one with a larger size is used for the data retransmission.

For a mix of data retransmission and new transmission, link adaptation for each codeword can also be done individually, and a set of scheduling blocks with a larger size may be used for both.

The same link adaptation ideas as described above can be used for co-scheduling multiple UEs with the same time and frequency resources.

The solutions described above have some drawbacks, however. For example, by applying two single codeword link adaptations, the need for real-time computing resources used for the computations is doubled.

Obtaining initial estimations of scheduling blocks is good for a reasonable split of the two codewords without complicated computations. However, for new data transmission scheduling, using two transport blocks with equal sizes does not take advantage of the fact that one codeword with a better channel quality has the potential to be scheduled with a larger transport block for a higher throughput.

For two-codeword retransmissions and for a mix of retransmission/new transmission, respectively, using single link adaptation for single codeword new transmission without being aware of the situation of the other codeword adds redundant computations for initial scheduling block estimations and scheduling block adjustments.

Various embodiments of the present invention are directed to methods and systems for performing link adaptation for effectively scheduling simultaneous downlink data transmission of two codewords with different modulation/coding schemes based on channel conditions. Particular embodiments relate to downlink data scheduling using transmission modes TM3, TM4, TM8, and/or TM9 when the UE reported rank indication is 2.

Some embodiments provide systems/methods that perform initial MCS selection in an efficient manner.

Some embodiments provide systems/methods that perform joint two-codeword link adaptation for new data transmission based on different channel conditions for each codeword.

Some further embodiments provide systems/methods that perform two-codeword link adaptation for data retransmission based on different channel conditions for each codeword.

Some embodiments provide systems/methods that perform two-codeword link adaptation for a mixture of retransmission and new transmission based on different channel conditions for each codeword.

Some aspects of the link adaptation algorithms described herein can be used on link adaptation for downlink transmission mode TM5, MU-MIMO and/or uplink MU-MIMO, with small variations in handling the two paired transport blocks from different UEs. The algorithms can be also extended to beamforming based MU-MIMO if the same time and frequency resources are to be shared among grouped UEs.

Figure 3:
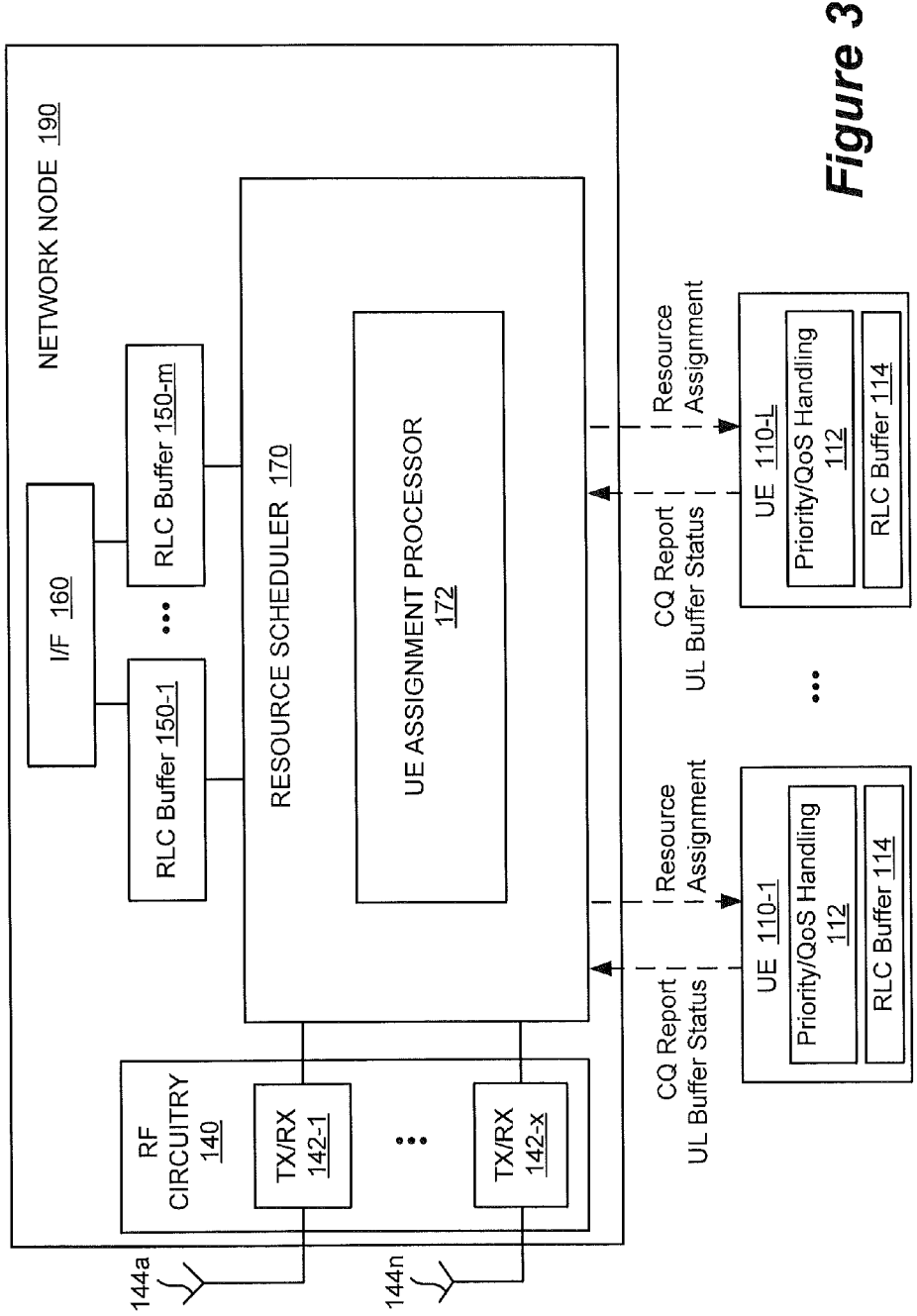
FIG. 3 is a block diagram of a portion of a network node that is configured according to some embodiments of the present invention and which may be used in each of the radio base station nodes (eNodeBs) of FIG. 1.

FIG. 3 is a block diagram of a portion of a network node 190 that is configured according to some embodiments of the present invention and which may be used in each of the radio base station nodes (eNodeBs) of FIG. 1. Referring to FIG. 3, the network node 190 includes a resource scheduler circuit 170 that may be configured to perform the operations and methods described herein in connection with FIGS. 5A-9. The resource scheduler 170 may include a plurality of processor circuits, which may correspond to separately packaged microprocessors and/or which may correspond to multiple processing core circuits within a microprocessor. An assignment processor 172 performs operations to compute channel quality measurement metrics and to perform operations to compute modulation and coding scheme metrics as described herein.

Figure 2A:
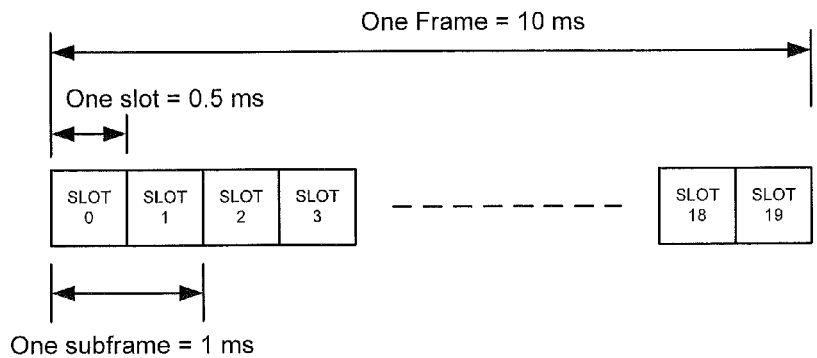
FIG. 2A illustrates the LTE frame structure.
Figure 2B:
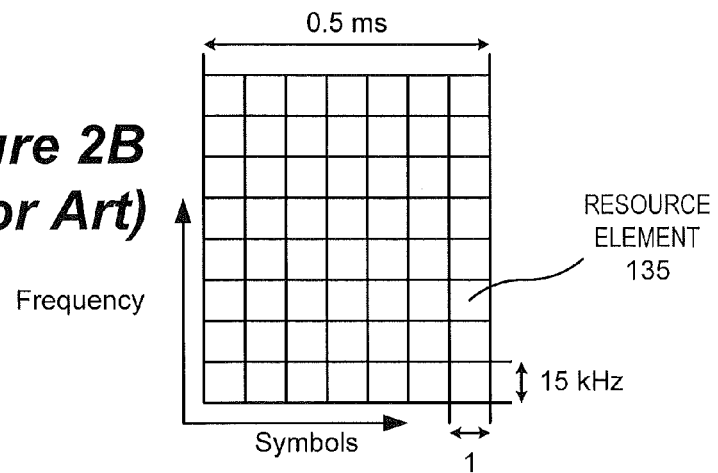
FIG. 2B illustrates a conventional resource grid of frequency and time resource elements that can be scheduled for communication use between a network node and UEs.
Figure 2C:
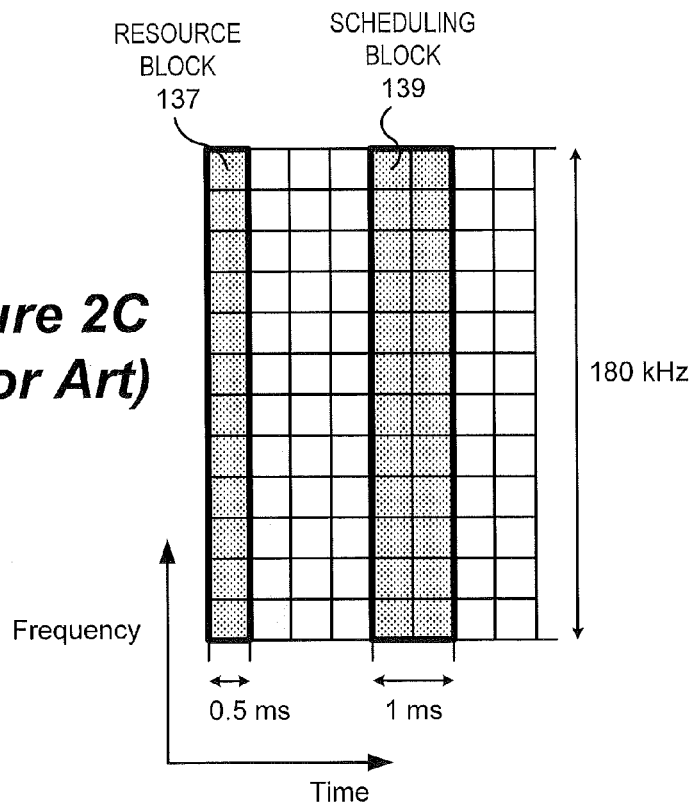
FIG. 2C illustrates an LTE resource grid in more detail.
Figure 2D:
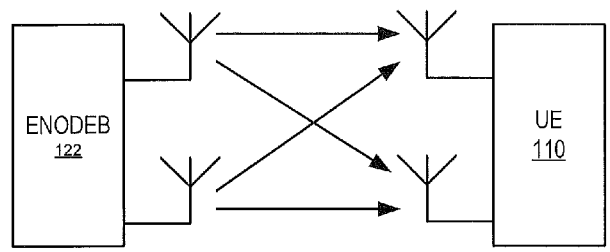
FIG. 2D illustrates multiple input-multiple output (MIMO) data transmission.

The network node 190 includes RF circuitry 40 having a plurality of transceivers (TX/RX) 142-1 to 144-x that communicate at different frequency subcarriers through antennas 144a-n to provide the exemplary multiple carrier portion of the resource grid shown in FIG. 2B. Although an exemplary one-to-one mapping of transceivers to antennas is shown, it is to be understood that any number of antennas may be used depending upon antenna configuration and design constraints. The resource scheduler 170 schedules the UEs 110-1 to 110-L to use the frequency and time resource elements (REs) responsive to the scheduling processes described above.

The network node 190 can be configured to receive channel status reports, uplink (UL) buffer status reports, and communication priority/QoS level indicators from the UEs 110-1 to 110-L, which are passed to the resources scheduler 170 for processing as described herein. The channel status reports can indicate instantaneous downlink channel quality in both time and frequency domain. The uplink buffer status reports can indicate how many data bits are buffered by a UE for uplink transmission (i.e., by the radio link control (RLC) buffer circuit 114). The UEs can communicate their communication priority/QoS level (i.e., by the priority/QoS handling circuit 112) within the CQ report or separately therefrom.

The network node 190 can also include a plurality of radio link control protocol buffers 150-1 to 150-M where downlink data that is received from the core network via the interface (I/F) 160, is buffered awaiting transmission to addressed UEs.

Figure 4:
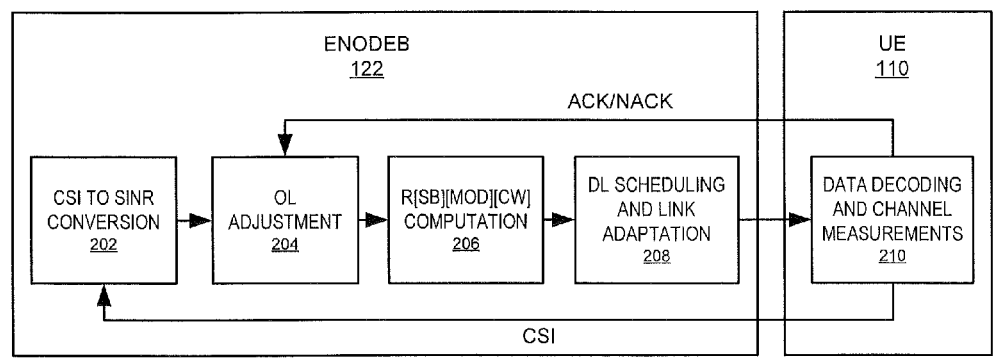
FIG. 4 is a block diagram illustrating operations of a radio base station node and a terminal according to some embodiments.

FIG. 4 illustrates operations of an eNodeB 122 and a UE 110 according to some embodiments. As shown therein, upon receipt of channel status information (CSI) from the UE 110, the eNodeB 122 converts the CSI into a SINR measurement (block 202). The eNodeB then performs outer loop adjustment (block 204) and calculates the channel quality measurement R[sb][mod][cw] for each scheduling block, modulation scheme and codeword (block 206). Outer loop adjustment is an algorithm for providing a SINR offset on top of the SINR measurement based on UE downlink ACK/NAK responses, so that block error rate (BLER) can be controlled at a desired percentage. The eNodeB performs downlink scheduling and link adaptation based on the channel quality measurement (block 208). Data is then transmitted to the UE 110 on the downlink.

The UE 110 decodes the data received on the downlink and performs channel quality measurements on the data. The data is acknowledged with an ACK or NAK depending on whether it was successfully decoded, and channel status information CSI is fed back to the eNodeB.

As noted above, for two codeword MIMO data transmission/retransmission, the latest CSI report from the UE must indicate a rank of at least 2, meaning that at least two layers are available to the UE. For each candidate UE to be scheduled in a given subframe, the channel quality measurements R[sb][mod][cw] that are associated with particular scheduling blocks, modulation schemes and codewords are calculated using the same algorithm applied for single codeword link adaptation. For each candidate UE to be scheduled during the subframe in question, the number of resource elements required for each scheduling block is computed.

The inputs to the systems/methods described herein are as follows:

[A] For new transmission, the size of the data to be transmitted (Ndata).

[B] For retransmission, the size of scheduling blocks (Nsb_prev), and sizes of data (Ndata[cw]) used for the previous data transmission.

[C] The available SB list (SBavail[ ]) with the number of available scheduling blocks (Nsb_avail).

[D] A channel quality measurement R[sb][mod][cw] for each codeword and modulation scheme for each available scheduling block (SBavail[i]).

[E] An associated RESB[i] for each available scheduling block SBavail[i], where RESB[i] refers to a number of resource elements in a scheduling block SB[i] that each RE can carry on a data symbol. Note that only REs available for downlink scheduling are considered here, with other overhead like reference signal excluded.

[F] The transport block size upper limit (NmaxTb) for each codeword based on transport block size boundary and UE capability.

[G] The transport block size lower limit (NminTb) for each codeword to be transmitted.

[H] A data size padding factor $\alpha$ for reducing scheduling blocks (where $\alpha > 1$).

Systems/methods for initial MCS selection according to some embodiments are as follows. As noted above, MCS refers to the modulation and coding scheme selected for a particular transmission. In LTE, a number of MCS levels (0 to 28) are defined which correspond to different combinations of modulation scheme and coding rate. In general, the more bits per symbol in the modulation scheme and/or the greater the coding rate, the higher the MCS level. Thus, higher MCS levels indicate higher data throughput. Increasing the MCS refers to changing the MCS level to a higher level, while decreasing the MCS refers to changing the MCS level to a lower level. MCS level 0 is the lowest MCS level, while MCS level 28 is the highest MCS level. It will be appreciated that embodiments of the present invention can be used with systems that have more or less than 29 MCS levels, however.

In general, an initial modulation and coding scheme MCSinit[cw] is selected for each codeword that will be used. The initial MCS selected for each codeword is an important factor in estimating the size ratio of the two codewords and in performing the initial scheduling block selection. Initial MCS selection according to embodiments of the invention can be performed according to one of three options.

Option A1 (Conventional): Start with MAX MCS for Both Codewords

Figure 5A:
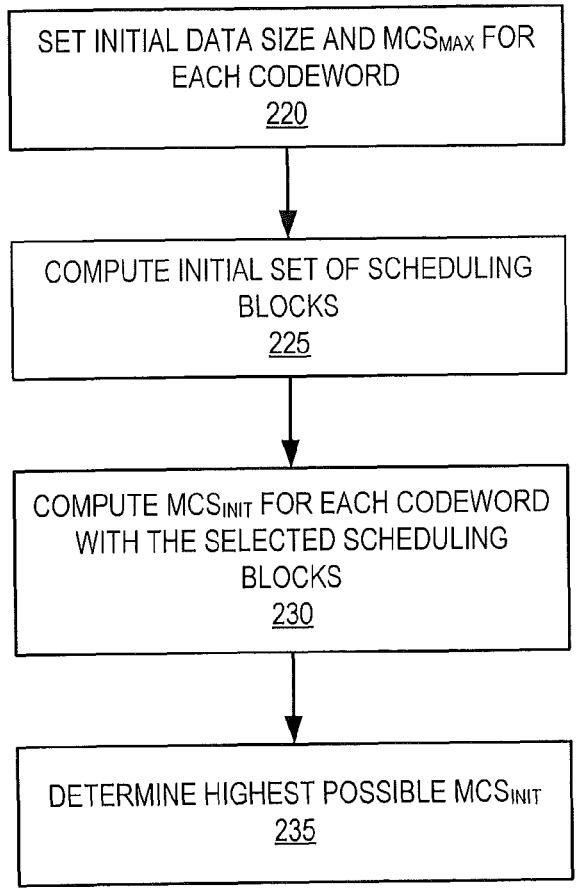
FIGS. 5A, 5B and 5C illustrate various operations for determining an initial MCS assignment for each codeword of a set of codewords that are being formatted for MIMO transmission.

A conventional method of determining the initial MCS selections for two codewords (CW0, CW1) is illustrated in FIG. 5A. As shown therein, in Step 1, an initial data size and a maximum MCS MCSmax[cw] are set for codeword 0 (codeword 1 is the same) (block 220).

The transmission data size for codeword 0 is set as the lesser of one half of the total data or the transport block upper size limit as follows:

$$N\text{data}[0] = \min(\tfrac{1}{2} N\text{data}, N\text{max}Tb) \quad [1]$$

The maximum MCS for codeword zero is set as the highest possible MCS for this codeword:

$$\text{MCSmax}[0] = \text{highest possible MCS for this codeword} \quad [2]$$

Step 2: An initial set of scheduling blocks is computed (block 225).

In this step, MCSmax[0] and Ndata[0] (the maximum MCS and the transmission data size for codeword 0, respectively) determine selected scheduling blocks (SBselect[ ]) from among the available scheduling blocks (SBavail[ ]). The number of scheduling blocks within SBselect[ ] is denoted as Nsb_select_init.

Step 3: An initial MCS selection MCSinit[cw] is computed for each codeword with the selected scheduling blocks (block 230).

For each codeword (cw=0, 1) and each modulation scheme, a sum of channel quality measurements is computed as follows:

$$R\text{sum}[\text{mod}][cw] = \sum_{sb \in SB_{select}[]} R[sb][\text{mod}][cw] \quad [3]$$

Finally, Rsum[mod][cw] and Nsb_select_init are used to determine the highest possible MCSinit[cw] for each codeword (block 235).

With this option, the MCSinit[cw] estimation is based on the sum of channel quality measurements over all scheduling blocks Rsum[mod][cw] with smallest number of possible scheduling blocks for transmission of a half size of the data with the highest MCS. Several steps of computations may be required for this option.

Option A2: Start with Whole Bandwidth Scheduling Blocks

Figure 5B:
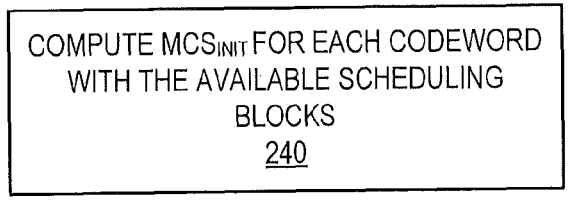

If Rsum[mod][cw] is already available for the whole bandwidth, then scheduling blocks that cover the entire bandwidth can be used without additional computation. This approach may be useful for large data block transmission. Referring to FIG. 5B, the systems/methods include:

Step 1: Compute MCSinit [cw] for each codeword with the available SBs (block 240).

In this approach, Rsum[mod][cw] and Nsb_bandwidth are used to determine the highest possible MCSinit[cw]. The initial number of selected scheduling blocks Nsb_select_init is set equal to the number of scheduling blocks available in the entire available bandwidth (Nsb_bandwidth):

$$N\text{sb\_select\_init} = N\text{sb\_bandwidth} \quad [4]$$

Option A3: Start with a Minimal Number of Scheduling Blocks

Figure 5C:
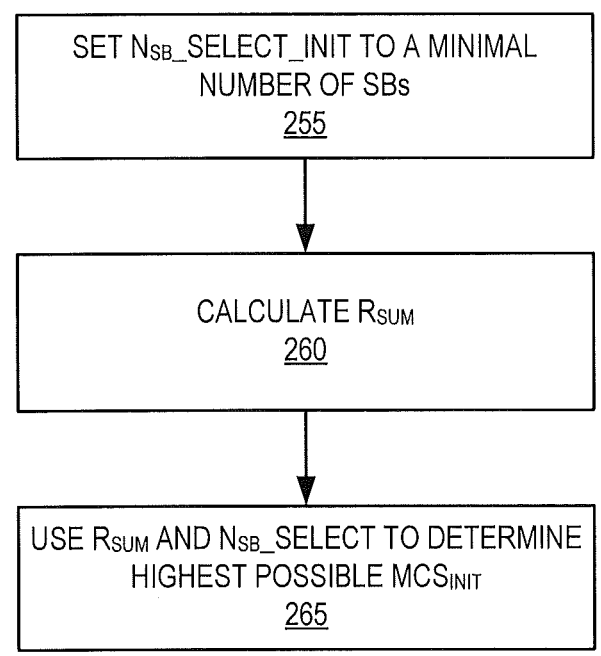

For small data block transmissions, and/or in situations where the channel qualities are fairly flat across the entire bandwidth, it may be useful to start with a minimal number of Scheduling Blocks. This option is illustrated in FIG. 5C.

Step 1: Compute MCSinit[cw] for each codeword with the available scheduling blocks as follows:
For each codeword (cw=0, 1) and each modulation:
Set Nsb_select_init equal to the minimal number of SBs to be allocated (one scheduling block or a scheduling block group based on required downlink control information format) (block 255).
Rsum is then generated directly from Nsb_select_init and R[sb][mod][cw] as follows (block 260):

$$R\text{sum}[mod][cw] = N\text{sb\_select\_init} * R[sb][mod][cw] \quad [5]$$

where sb is the first scheduling block of Nsb_select scheduling blocks to be allocated.

Rsum[mod][cw] and Nsb_select are then used to determine the highest possible MCSinit[cw] for each codeword (block 265).

For the initial MCS selection (i.e., the MCSinit[cw] computation), options 2 and 3 may significantly reduce the computing effort required without sacrificing significant accuracy in the MCS estimations, especially when the size of the data transmitted is large for Option 2 or small for Option 3.

Figure 6A:
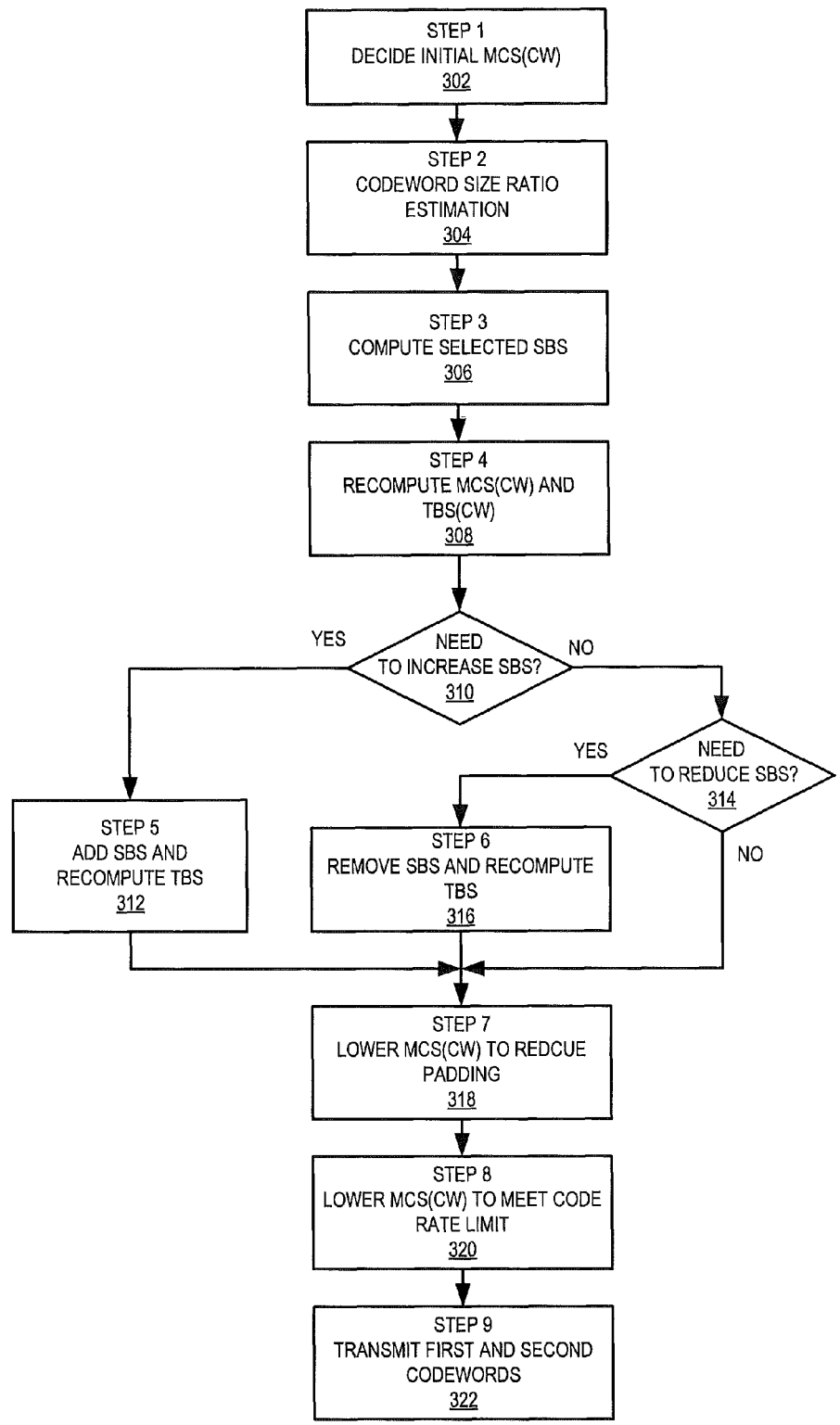
FIGS. 6A, 6B and 7-9 are flowcharts illustrating operations of systems/methods according to some embodiments.

Systems/methods for performing joint two-codeword link adaptation for new data transmission based on different channel conditions for each codeword are illustrated in FIG. 6A.

As shown therein, the systems/methods first determine an initial modulation and coding stream (MCS) (block 302). The methods described above in connection with FIGS. 5A-5C may be used for initial MCS selection.

Next, a size ratio of the two codewords (CW0, CW1) is estimated (block 304). Selected scheduling blocks SB are then computed (block 306).

The MCS selections for each codeword are then re-computed along with the transport block size for each codeword (block 308).

A determination is then made as to whether it is necessary to increase the number of scheduling blocks used (block 310). If so, scheduling blocks are added and the transport blocks are recomputed (block 312). If not, it is determined at block 314 if it is necessary to reduce the number of scheduling blocks. If so, one or more scheduling blocks are removed, and the transport blocks are recomputed (block 316).

Next, the MCS for each codeword is lowered to the extent necessary to reduce padding (block 318). The MCS for each codeword is then lowered to the extent necessary to meet the target code rate limit (block 320). Finally, the first and second codewords are transmitted over different MIMO layers (block 322).

Estimating the data size for codeword 0, ($N_{data}[0]$) (block 304) can be performed as follows:

First, a predicted throughput per scheduling block ($B_t[cw]$) is generated for each codeword based on the initial MCS selection ($MCS_{init}[cw]$) for each codeword. There are two ways of predicting throughput per scheduling block and per codeword. In one aspect, the predicted throughput per scheduling block can be calculated from the initial MCS assignment ($MCS_{init}[cw]$) and transport block size (TBS) as follows:

$$B_{t1}[cw] = \frac{1}{BW} \sum_{i=1}^{BW} \frac{TBS_i^{mcs_{init}[CW]}}{i} \quad [6]$$

The approach shown in Equation [6] above calculates the average number of bits per scheduling block in 3GPP table for $MCS_{init}$ [cw] and BW is the bandwidth index relative to 200 kHz. For example, BW=100 if 20 MHz is used.

In a second aspect the predicted throughput per scheduling block can be calculated from $R_{sum}[mod][cw]$ and $N_{sb\_select\_init}$ as follows:

$$B_{t2}[cw] = \max(R_{sum}[mod][cw])/N_{sb\_select\_init} \quad [7]$$

The approach shown in Equation [7] above calculates the average number of bits per scheduling block predicted by channel quality measurements with the best modulation choice.

Either of these results can be used to estimate data size for codeword 0, as follows:

$$N_{data}[0] = \min(N_{data} \times B_{t}[0]/(B_{t}[0]+B_{t}[1]), N_{maxTb}) \quad [8]$$

Computing the selected scheduling blocks (block 306) can be performed as follows, $MCS_{init}[0]$ and $N_{data}[0]$ can be used to determine the scheduling blocks that are to be included in the set of selected scheduling blocks $SB_{select}[\ ]$, where $SB_{select}[\ ] \subseteq SB_{avail}[\ ]$.

$N_{sb\_select}$ is defined as the number of scheduling blocks within $SB_{select}[\ ]$. There are several other ways of calculating $N_{sb\_select}$, any of which can be used:

$$N_{sb\_select\,1} = N_{data}/(B_{t1}[0]+B_{t1}[1]) \quad [9]$$

$$N_{sb\_select\,2} = N_{data} * B_{t2}[0]/((B_{t2}[0]+B_{t2}[1])*B_{t1}[0]) \quad [10]$$

$$N_{sb\_select\,3} = (N_{sb\_select\,1}+N_{sb\_select\,2})/2 \quad [11]$$

$$N_{sb\_select\,4} = \min(N_{sb\_select\,1}, N_{sb\_select\,2}) \quad [12]$$

$$N_{sb\_select\,5} = \max(N_{sb\_select\,1}, N_{sb\_select\,2}) \quad [13]$$

For example, if $N_{data}$ is small, more scheduling block resources could be allocated to reduce the number of search loops by selecting $N_{sb\_select\,5}$. If $N_{data}$ is large, fewer scheduling block resources could be allocated to reduce the computation complexity of $R_{sum}[mod][cw]$) by selecting $N_{sb\_select\,4}$. The total number of resource elements $RE_{total}$ is then calculated as follows:

$$RE_{total} = \sum_{RE \in SB_{select}[]} RE \quad [14]$$

Re-computing the MCS with newly selected scheduling blocks and determining the transport block size (TBS) for each codeword (block 308) may be performed according to the following algorithm:

- For each codeword (cw=0, 1):
  - For each modulation, re-compute $R_{sum}$ with the new set of selected SBs as follows:
    - $R_{sum}[mod][cw] = \sum_{sb \in SB_{select}[]} R[sb][mod][cw]$

- End For
- Use $R_{sum}[mod][cw]$ and $N_{sb\_select}$ to determine highest possible MCS[cw] that satisfies channel quality requirement -continued

- $TB_{size}[cw] = TBS\_table[MCS[cw]][N_{sb\_select}]$ (where TBS_table refers to the 3GPP TS36.213)
- If $TB_{size}[cw] > N_{maxTb}$
  - Reduce MCS[cw]
  - $TB_{size}[cw] = TBS\_table[MCS[cw]][N_{sb\_select}]$ until $TB_{size}[cw] <= N_{maxTb}$
- End If
- End For The scheduling block adjustment is only at one direction so only one of the next two steps is taken: either increasing scheduling blocks as in step 5 (block 312), or reducing scheduling blocks as in step 6 (block 314):

Set allowAddSbs=TRUE     [15]

Set allowRemoveSbs=TRUE     [16]

In Step 5 (block 312), the systems/methods try to empty data buffer and meet the minimal transport block size requirement by adding scheduling blocks. If it is not possible to add scheduling blocks, MCS[cw] may be increased to meet the minimal transport block size requirement.

- While ((min ($TB_{size}[0]$, $TB_{size}[1]$) < $N_{minTb}$) OR (($TB_{size}[0]$ + $TB_{size}[1]$) < $N_{data}$)) AND (allowAddSbs == TRUE)
  - Set allowRemoveSbs = FALSE (for blocking step 6)
  - If Nsb_selected < Nsb_avail
    - Include additional smallest unit of SB(s) into SBselect[ ] from SBavail[ ] to get Nsbs_temp > Nsb_select
    - For each codeword (cw = 0, 1):
      - TBsize_temp [cw] = TBS_table[MCS[cw]][ Nsbs temp]
      - If TBsize temp [cw] > NmaxTb, then Set allowAddSbs = FALSE
    - End For
    - If allowAddSbs == TRUE
      - Add the SBs in SBselect[ ]
      - Nsb_select = Nsbs_temp
      - Update REtotal by adding REs belonging to the SBs
      - For each codeword (cw = 0, 1):
        - TBsize [cw] = TBsize_temp [cw]
      - End If
  - Else
    - Set allowAddSbs = FALSE
    - For codeword 0 and/or 1, if TBsize [cw] < NminTb
      - Increase MCS[cw] until the lowest possible one to meet TBsize [cw] >= NminTb
      - If no MCS[cw] can be found to make TBsize [cw] >= NminTb, this codeword is not to be scheduled for data transmission.
    - End For
  - End if
- End while In Step 6 (block 316), over-allocated SBs are removed. This step is executed only if the algorithm does not go through the process of adding scheduling blocks as described above in connection with block 312. SBs may be remove according to the following procedure:

- While ($TB_{size}[0]$ + $TB_{size}[1]$ > $\alpha N_{data}$) AND (allowRemoveSbs == TRUE)
  - If $N_{sb\_select}$ > minimal unit of SBs
    - Exclude the smallest unit of SB(s) from $SB_{select}[\ ]$ to get $N_{sbs\_temp} < N_{sb\_select}$
    - For each codeword (cw = 0, 1):
      - $TB_{size\_temp}[cw]$ = TBS_table[MCS[cw]][ $N_{sbs\_temp}$]
      - If $TB_{size\_temp}[cw] < N_{minTb}$, then set allowRemoveSbs = False
    - End For
    - If (allowRemoveSbs == TRUE) AND ($TB_{size\_temp}[0]$ + $TB_{size\_temp}[1]$ >= $N_{data}$):
      - Remove the SBs from $SB_{select}[\ ]$
      - $N_{sb\_select} = N_{sbs\_temp}$
      - Update $RE_{total}$ by removing REs belonging to the SBs
      - For each codeword (cw = 0, 1):
        - Set $TB_{size}[cw]$ = $TB_{size\_temp}[cw]$
    - End If
  - Else
    - Set allowRemoveSbs = False
  - End if
- End while In Step 7 (block 318), data padding may be minimized or reduced by reducing MCS[cw] as follows:

- While ($TB_{size}[0]$ + $TB_{size}[1]$) > $N_{data}$)
  - It is preferable to start with the higher MCS[cw]. Alternatively, reduce MCS[cw] until the lowest MCS[cw] is found that meets both conditions below:
    - min($TB_{size}[0]$, $TB_{size}[1]$) >= $N_{minTb}$ with $N_{sb\_select}$ and adjusted MCS[cw];
    - ($TB_{size}[0]$ + $TB_{size}[1]$)>= $N_{data}$.
- End While In Step 8 (block 320), code rate limitations may be met by further reducing MCS[cw] as follows:

For each codeword, if the transport block size $TB_{size}[cw]$ exceeds the coding rate limitation, the MCS for this codeword is reduced until the limitation is met, or this codeword is not to be scheduled for data transmission.

Outputs from the link adaptation for new data transmission are:

[1] A set of SBs selected for PDSCH resource allocation: $SB_{select}[\ ]$.

[2] A transport block size for each codeword: $TB_{size}[0]$ and $TB_{size}[1]$. If no data can be scheduled for a codeword, the related size is zero.

[3] An MCS used for each codeword: MCS[0] and MCS[1] with indication of whether the codeword(s) can be scheduled.

[4] A total number of REs ($RE_{total}$) to be used for the data transmission.

In Step 5 (block 312) and Step 6 (block 316), to reduce the search loops, the systems/methods can also use one of the options B1 to B6 described below for calculating $N_{sbs\ temp}$.

Other alternatives for two-codeword link adaptations for new data transmission are described below, including a number of methods for calculating the required number of SBs based on the previous estimated results, different searching modes for CW0 and CW1, and the use of a condition to refine the link adaptation results.

In some embodiments, the required number of SBs may be re-calculated based on the previous estimated results. In this regard, the following notations are used:

Ndata: Data in the buffer to be transmitted
P: Padding factor which is a configuration parameter
SB_step: The minimum SB allocation unit
N_SBS_1: the previous estimated number of SBs
MCS0_1: the previous estimated MCS for CW0
MCS1_1: the previous estimated MCS for CW1
TBS0: The TB size for CW0 determined by MCS0_1 and N_SBS_1 based on the 3GPP table
TBS1: The TB size for CW0 determined by MCS1_1 and N_SBS_1 based on the 3GPP table
Bt1[0]=the average number of bits per SB for MCS0_1 calculated from the 3GPP table
Bt1[1]=the average number of bits per SB for MCS1_1 calculated from the 3GPP table
Bt2[0]=the average number of the required bits per SB for MCS0_1
Bt2[1]=the average number of the required bits per SB for MCS1_1
R0: the required link quality for CW0 determined by MCS0_1 and N_SBS_1
R1: the required link quality for CW1 determined by MCS1_1 and N_SBS_1
C0: the calculated link quality for CW0 determined by MCS0_1 and N_SBS_1
C1: the calculated link quality for CW1 determined by MCS1_1 and N_SBS_1
N_SBS_1 the newly calculated number of SBs based on the previous estimated results To simplify the discussion, it is assumed that CW0 has equal or higher channel quality than that of CW1.

Recalculating the required number of SBs may be performed according to any of the following options B1 to B6 when the channel qualities for both codewords meet their requirements, respectively, but either the total transport block size for both codewords is less than the data to be transmitted (TBS0+TBS1<Ndata) or the total transport block size for both codewords is greater than the padded size of the data to be transmitted (TBS0+TBS1>(1+P)*Ndata).

Option B1:

$$N\_SBS\_2 = \text{ceil}\{(1+P)*N\text{data}/[(Bt1[0]+Bt1[1])*SB\_\text{step}]\}*SB\_\text{step} \quad [17]$$

Option B2:

$$N\_SBS\_2 = N\_SBS\_1 + \text{ceil}\{(1+P)*N\text{data} - TBS0 - TBS1)/[(Bt1[0]+Bt1[1])*SB\_\text{step}]\}*SB\_\text{step} \quad [18]$$

Option B3:

$$N\_SBS\_2 = \text{ceil}\{N\_SBS\_1*(1+P)*N\text{data}/[(TBS0+TBS1)*SB\_\text{step}]\}*SB\_\text{step} \quad [19]$$

Option B4:
N_SBS_2 is calculated as the maximum value from options 1, 2, and 3.

Option B5:
Use one of the above options to estimate N_SBS_2 first, and then use the iterative method described in connection with FIG. 6A to refine the result.

Option B6:
Based on the previous estimated results, use the iterative method described in connection with Step 5 (block 312) of FIG. 6A to obtain N_SBS_2.

In some embodiments, the number of SBs may be increased according to one of the following options when TBS0+TBS1>=Ndata, but the channel quality calculated for either CW0 or CW1 does not meet the channel quality requirement:

Option C1:

$$N\_SBS\_2 = N\_SBS\_1 + \text{ceil}\{(R0+R1-C0-C1)/[(Bt2[0]+Bt2[1])*SB\_\text{step}]\}*SB\_\text{step} \quad [20]$$

Option C2:

$$N\_SBS\_2 = \text{ceiling}\{N\_SBS\_1*(R0+R1)/[(C0+C1)*SB\_\text{step}]\}*SB\_\text{step}\} \quad [21]$$

Option C3:
N_SBS_2 is calculated as the maximum value of option 1 & 2.

Figure 6B:
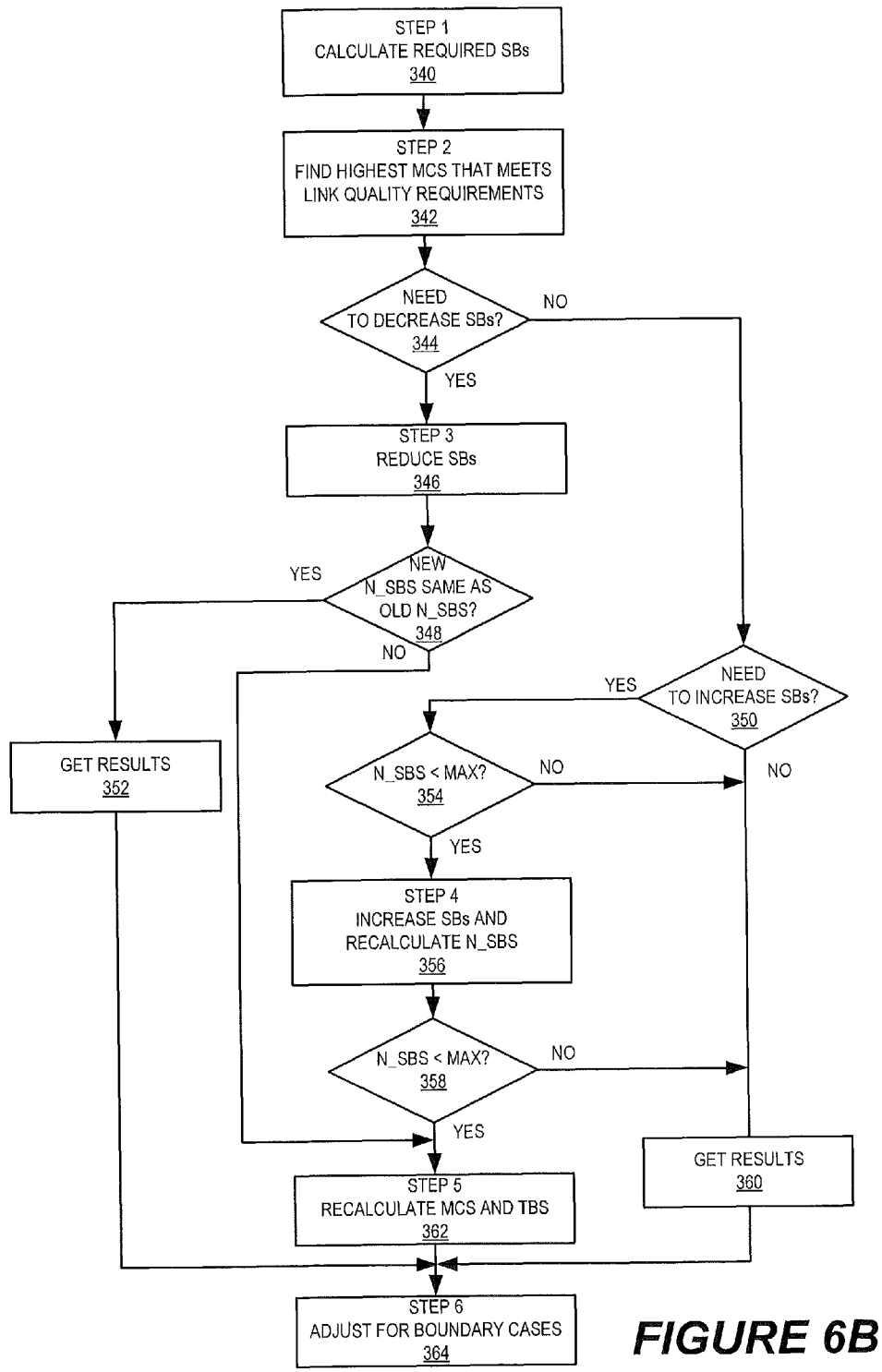

Methods of determining the MCS, TBS and number of scheduling blocks (NsB) for new data transmission according to further embodiments may be performed as illustrated in FIG. 6B.

As shown therein, in Step 1 (block 340), the required number of SBs is calculated based on initial MCS of two CWs, mcs_0(0) and mcs_0(1) as follows:

$$N\_SBS\_1 = \text{ceil}\{N\text{data}/(Bt[mcs\_0(0)] + Bt[mcs\_0(1)])*SB\_\text{step})\}*SB\_\text{step} \quad [22]$$

$$N\_SBS\_1 = \min(N\_SBS\_1, \text{max number of available SBs}) \quad [23]$$

Where SB_Step is the smallest unit by which the number of SBs can be increased or decreased.

In Step 2 (block 342), the systems/methods search for the highest MCS for each CW that meets the link quality requirement. Given the estimate of the number of SBs, N_SBS_1, the link quality for these SBs is calculated for each CW.

The link quality requirement table is searched for each CW to find the maximum MCS (given the number of SBs) for which calculated link quality is greater than or equal to the required link quality.

The selected MCS for each CW is denoted as mcs_1(0) and mcs_1(1), respectively, and its corresponding TBS is denoted as TBS_1(0) and TBS_1(1), respectively.

A check is then made at block 344 to determine if (TBS_1(0)+TBS_1(1))>(1+P)*Ndata (i.e., to see if the total transport block size for both codewords is greater than the padded data size, in which case there is a need to reduce the number of SBs). If so, operations proceed to step 3 (block 346). Otherwise, a check is made at block 350 to determine if (TBS_1(0)+TBS_1(1))<Ndata (i.e., to determine if the total transport block size for both codewords is less than the amount of data to be transmitted, in which case there is a need to increase the number of SBs). If so, operations proceed to Step 4 (block 354). If not, then results for TBS0, TBS1, MCS0, MCS1 N_SBS are obtained as follows:

TBS0=TBS_1(0)
TBS1=TBS_1(1)
MCS0=mcs_1(0)
MCS1=mcs_1(1)
N_SBS=N_SBS_1

Operations then proceed to Step 6 (block 364)

If it is determined at block 344 that (TBS_1(0)+TBS_1(1))>(1+P)*Ndata, then operations proceed to Step 3 (block 346). In this case, N_SBS_1 is much larger than required. As a result, it needs to be reduced.

Based on mcs_1(0), mcs_1(1), TBS_1(0), TBS_1(1), and N_SBS_1, one of the options B1 to B6 described above is used to re-calculate the required number of SBs, and N_SBS_2.

A check is then made at block 348 to determine if N_SBS_2==N_SBS_1. If so, then results for TBS0, TBS1, MCS0, MCS1 N_SBS are obtained as follows in block 352, after which operations proceed to Step 6 (block 364):

TBS0=TBS_1(0)
TBS1=TBS_1(1)
MCS0=mcs_1(0)
MCS1=mcs_1(1)
N_SBS=N_SBS_1

It is also possible to use the methods described for Step 7 (block 318) in FIG. 6A to reduce the padding if necessary.

If N_SBS_2<>N_SBS_1, then operations proceed to Step 5 (block 362).

Step 4 (block 354) is entered if it is found at block 350 that the total TB size is smaller than the amount of data to be transmitted [(TBS_1(0)+TBS_1(1))<Ndata]. In this case, the estimated number of SBs (N_SBS_1) is smaller than required. As a result, the number of SBs needs to be increased.

First, a check is made at block 356 to see if there are any available scheduling blocks that can be added.

If N_SBS_1 is already equal to the maximum number of available SBs, then operations proceed to block 360, where the results are obtained as follows:

TBS0=TBS_1(0)
TBS1=TBS_1(1)
MCS0=mcs_1(0)
MCS1=mcs_1(1)
N_SBS=N_SBS_1

Based on mcs_1(0), mcs_1(1), TBS_1(0), TBS_1(1), and N_SBS_1, one of the options B1 to B6 described above may be used to re-calculate the required number of SBs, and N_SBS_2.

Next, N_SBS_2 is checked against the maximum number of available SBs. If N_SBS_2 is equal to the maximum number of available SBs (block 358), then given the estimated number of SBs, and N_SBS_2, a search is made for the highest MCS for each CW that meets the link quality requirement. The selected MCS and its corresponding TBS for each CW are denoted as mcs_2(0), mcs_2(1), TBS_2(0), and TBS_2(1), respectively.

The results are then obtained as:

TBS0=TBS_2(0)
TBS1=TBS_2(1)
MCS0=mcs_2(0)
MCS1=mcs_2(1)
N_SBS=N_SBS_2

Operations then proceed to Step 6 (block 364).

Otherwise, if N_SBS_2<>max number of available SBs, operations proceed to Step 5 (block 362), at which a search is made for the TBS or MCS for each CW based on the new estimated number of SBs and N_SBS_2.

Given time constraints on link adaptation, a time budget for the link adaptation may be checked and the link adaptation algorithm adjusted accordingly. In some embodiments, one or more of the following conditions can be used to select the link adaptation algorithms or refine the link adaptation results if required.

First condition (COND1): the time budget allocated for each LA operation is not exceeded In this scenario, the overall time period for the final link adaptation can be divided equally by the number of SEs to be scheduled, denoted as T. When the kth scheduling element SE is being allocated the resources, the accumulated time, T_ac, used so far can be checked against kT. If T_ac<kT, the link adaptation results may be refined further. A scheduling element is an element to which resources are allocated, such as a UE. However, an SE can include any element for which system resources can be allocated.

The overall time period for the final link adaptation can be divided un-equally. For example, the system can allocate more time for the earlier link adaptation operations and less time for the later link adaptation operations.

Second condition (COND2): The required_Tbs>Threshold_Tbs and the time budget for the final link adaptation is not exceeded A deadline timer can be defined. When the timer is expired, the resource scheduler can only perform one more link adaptation operation. In this case, the scheduler will allocate all the remaining resources to the next SE to be scheduled and perform the last link adaptation. In this scenario, if required_Tbs>Threshold_Tbs and the deadline timer is not expired, the LA results will be refined further. During the implementation, the Threshold_Tbs can also be adaptively adjusted based on the ratio of the time available so far to the remaining number of SEs to be scheduled. Initially, Threshold_Tbs can be set relative smaller. If the radio becomes smaller, Threshold_Tbs will be increased accordingly to prevent performing the refine algorithm for the remaining link adaptation operations.

Third condition (COND3): a fixed number of link adaptation operations have not been performed.

In this scenario, if required_Tbs>Threshold_Tbs and the fixed number of link adaptation operations for performing the refined algorithm is not exceeded, the link adaptation results will be refined.

If one of these conditions (COND1 to COND3) is not met (i.e., the resource scheduler has run out of time), then one of the following options (D1-D3) may be performed in Step 5 (block 362):

Option D1:

In this option, an attempt is made to empty the data buffer without checking the channel quality.

Given the estimated number of SBs and N_SBS_2, a search is made for the lowest MCS for each CW such that the sum of their corresponding TB sizes is greater or equal to Ndata. The selected MCSs and their corresponding TB sizes are denoted as mcs_2(0), mcs_2(1), TBS_2(0), and TBS_2(0), respectively.

The results are then obtained as follows:

TBS0=TBS_2(0)
TBS1=TBS_2(1)
MCS0=mcs_2(0)
MCS1=mcs_2(1)
N_SBS=N_SBS_2

Operations then proceed to Step 6 (block 364).

Option D2:

In this option, an attempt is made to empty data buffer by only checking the channel quality for CW0.

Given N_SBS_2, a search is made for the highest MCS for CW0 that meets the link quality requirement. The selected MCS and its corresponding TBS are denoted as mcs_2(0) and TBS_2(0), respectively.

A search is then for the lowest MCS for CW1 whose corresponding TBS is greater or equal to (Ndata−TBS_2(0)). The selected MCS and its corresponding TBS are denoted as mcs_2(1) and TBS_2(1), respectively.

The results are then obtained as follows:

TBS0=TBS_2(0)
TBS1=TBS_2(1)

MCS0=mcs_2(0)
MCS1=mcs_2(1)
N_SBS=N_SBS_2
Operations then proceed to Step 6 (block 364).
Option D3:
In this option, an attempt is made to check the channel quality for both CWs; this does not guarantee emptying the data buffer, however.
Given N_SBS_2, a search is made for the highest MCS for each CW that meets the link quality requirement. The selected MCSs and their corresponding TB sizes are denoted as mcs_2(0), mcs_2(1), TBS_2(0), and TBS_2(0), respectively.
If (TBS_2(0)+TBS_2(1))>(1+P)*Ndata, padding may be reduced using Step 7 (block 318) of FIG. 6A.
The results may be obtained as follows:
TBS0=TBS_2(0
TBS1=TBS_2(1)
MCS0=mcs_2(0)
MCS1=mcs_2(1)
N_SBS=N_SBS_2
Operations then proceed to Step 6 (block 364).
If the conditions have not been met (i.e., the resource scheduler has not run out of time), then one of the following options (E1, E2) may be performed in Step 5:
Option E1:
Given N_SBS_2, a search is made for the highest MCS for CW0 that meets the link quality requirement. The selected MCS and its corresponding TBS are denoted as mcs_2(0) and TBS_2(0), respectively.
Then, a search is made for the lowest MCS for CW1 whose corresponding TBS is greater or equal to (Ndata−TBS_2(0)). The selected MCS and its corresponding TBS are denoted as mcs_2(1) and TBS_2(1), respectively.
For CW1, calculate its link quality by using N_SBS_2 and the modulation mode corresponding to mcs_2(1).
If (calculated_link_quality/required_link_quality>=1−link quality margin), then the results may then be obtained as follows:
TBS0=TBS_2(0
TBS1=TBS_2(1)
MCS0=mcs_2(0)
MCS1=mcs_2(1)
N_SBS=N_SBS_2
Operations then proceed to Step 6 (block 364).
Otherwise, if (calculated_link_quality/required_link_quality<1−link quality margin), the required number of SBs and N_SBS_3 are recalculated using one of options C1 to C3 described above.
If Step 5 (block 362) is entered from Step 3, then N_SBS_3 is calculated as:

$$N\_SBS\_3 = \min(N\_SBS\_3, NSB\_1) \quad [24]$$

Otherwise, N_SBS_3 is calculated as:

$$N\_SBS\_3 = \min(N\_SBS\_3, \text{max number of available } SBs) \quad [25]$$

Given the estimated number of SBs and N_SBS_3, a search is made for the lowest MCS for each CW such that the sum of their corresponding TB sizes is greater or equal to Ndata. The selected MCSs and their corresponding TB sizes are denoted as mcs_3(0), mcs_3(1), TBS_3(0), and TBS_3(0), respectively.
The results may then be obtained as follows:
TBS0=TBS_3(0
TBS1=TBS_3(1)
MCS0=mcs_3(0)
MCS1=mcs_3(1)
N_SBS=N_SBS_3
Operations then proceed to Step 6 (block 364).
Option E2:
Given N_SBS_2, a search is made for the highest MCS for each CW that meets the link quality requirement. The selected MCSs and their corresponding TB sizes are denoted as mcs_2(0), mcs_2(1), TBS_2(0), and TBS_2(0), respectively.
If (TBS_2(0)+TBS_2(1))>=Ndata, then padding may be reduced using Step 7 (block 318) of FIG. 6A if necessary.
The results may then be obtained as:
TBS0=TBS_2(0
TBS1=TBS_2(1)
MCS0=mcs_2(0)
MCS1=mcs_2(1)
N_SBS=N_SBS_2
Operations then proceed to Step 6 (block 364).
Otherwise, if (TBS_2(0)+TBS_2(1))<Ndata, then the required number of SBs, N_SBS_3 may be recalculated using one of the options B1 to B6 described above.
If Step 5 was entered from Step 3, then N_SBS_3 is calculated as:

$$N\_SBS\_3 = \min(N\_SBS\_3, NSB\_1) \quad [26]$$

Otherwise, N_SBS_3 is calculated as:

$$N\_SBS\_3 = \min(N\_SBS\_3, \text{maximum number of available } SBs) \quad [27]$$

Figure 7:
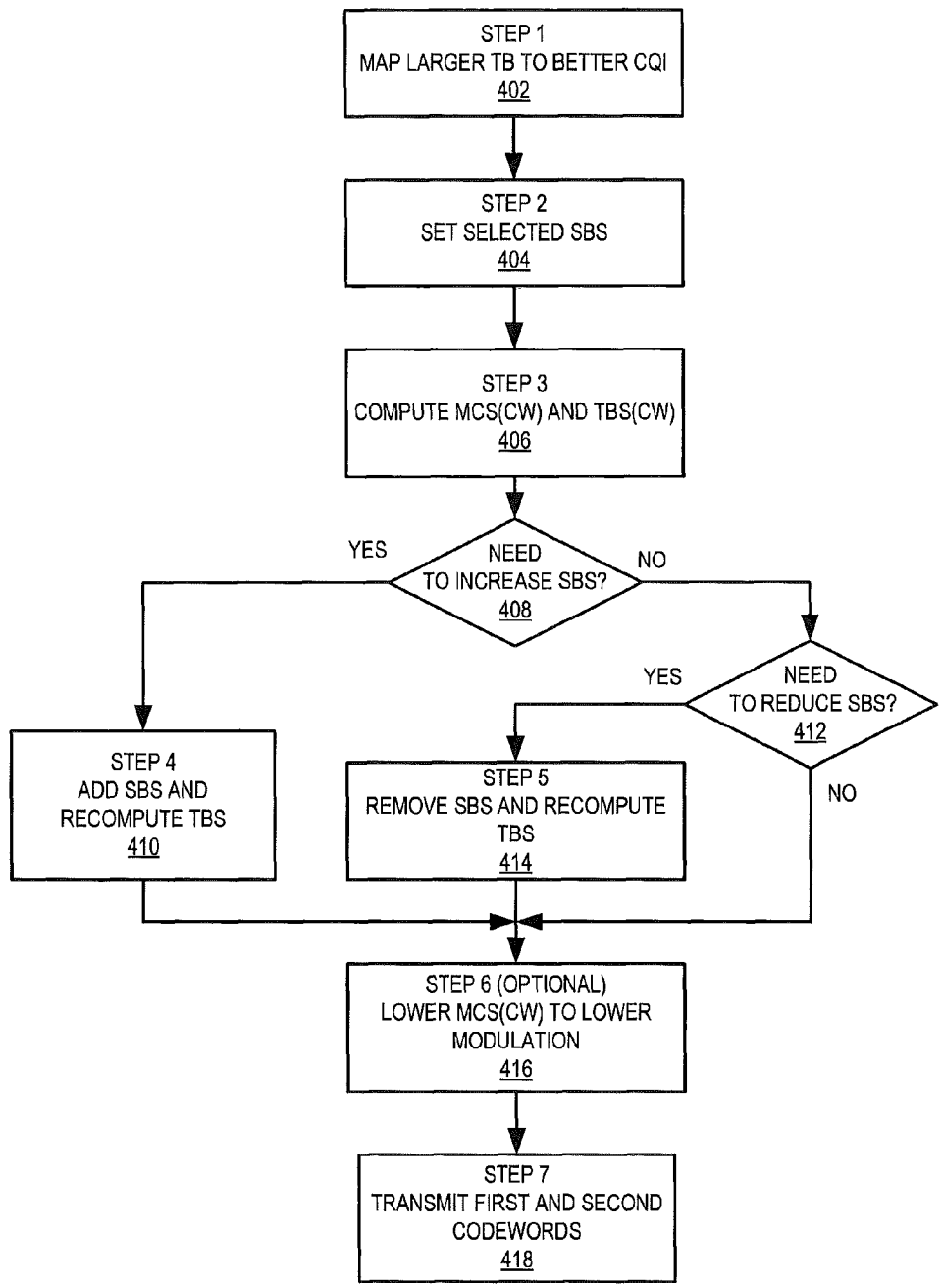

Given the estimated number of SBs and N_SBS_3, a search is made for the lowest MCS for each CW such that the sum of their corresponding TB sizes is greater or equal to Ndata. The selected MCSs and their corresponding TB sizes are denoted as mcs_3(0), mcs_3(1), TBS_3(0), and TBS_3(0), respectively.
The results may then be obtained as:
TBS0=TBS_3(0
TBS1=TBS_3(1)
MCS0=mcs_3(0)
MCS1=mcs_3(1)
N_SBS=N_SBS_3
Operations then proceed to Step 6 (block 364).
In Step 6 (block 364), the corner cases, such as NminTb, NmaxTb, coding rate limitation, etc., are checked, and appropriate adjustments are made if required. Then the results are output as follows:
[1] Number of SBs selected for PDSCH resource allocation (N_SBS)
[2] Transport block size for each codeword (TBS0 and TBS1). If no data can be scheduled for a codeword, the related size=0
[3] MCS used for each codeword (MCS0 and MCS1) with indication if codeword(s) can be scheduled.
[4] Total REs (REtotal) to be used for the data transmission
For link adaptation for two-codeword transmission of new data, the systems/methods described above may reduce the computation efforts needed for link adaptation with the awareness that the two codewords share the same set of SBs. The transport block arrangement between the two codewords is involved in each link adaptation step, which may help to achieve the throughput requirements for each codeword with fewer allocated physical resources.
Systems/methods according to some embodiments for performing two-codeword link adaptation for data retransmission based on different channel conditions for each codeword are illustrated in FIG. 7.
If a UE 110 responds with a NACK (negative acknowledgement—indicating transmission failure) for both codewords in a previous transmission, retransmission for both codewords can be scheduled at the eNodeB 122 once the NACKs are received. Performing link adaptation for the retransmissions can promote successful data retransmission with updated channel qualities and actual SB allocations.

The two retransmitted transport blocks are considered to be independent to one other. For the retransmission, each TB size that is associated with the allocated SBs with selected MCS should be no smaller than the original TB size, in order to meet the expected HARQ target requirements.

One option for two-codeword retransmission is to simply use the previous MCSes and number of SBs for data retransmission without performing link adaptation. A minimal effort is required for retransmission scheduling and valid if channel quality measurements haven't changed, and either the same set of SBs are allocated or the subband channel qualities are fairly flat, plus the number of REs are not altered.

Another option is to perform link adaptation only on a codeword with a higher channel quality or higher initial estimated number of SBs required, which can be calculated using either of the following formulas:

$$cw\text{select}=\text{codeword with max}(TBS[cw]/Bt[cw], cw=0, 1) \quad [28]$$

Where TBS[cw] is size of the initial TB to be retransmitted; Bt[cw] is based from the latest SINR.

Then the MCS for the other codeword can be determined with the desired TB size and SBs. Although it reduces the effort required to perform link adaptation, the throughput requirement for the second codeword may not be met.

In some embodiments, link adaptation for two-codeword retransmission may be performed as illustrated in FIG. 7. Referring to FIG. 7, the larger TB is mapped to the channel with the highest channel quality (block 402), which may result in the codewords being swapped. That is, in Step 1, the algorithm compare TB sizes and wideband channel qualities for each codeword, and causes the TB with the larger TB size to be scheduled on the channel with better channel quality. A swap flag may be set accordingly. For TM3 and TM4, the swap flag is sent to the UE as part of the DL grant. For TM8 and TM9, the swap is reflected by beamforming information in UE-specific reference signals.

Next, in Step 2 the selected SBs are set in SBselect[ ] (block 404). This may be performed as follows:

$$Nsb\_select = \min(Nsb\_prev, Nsb\_avail) \quad [29]$$

$$\text{Include } Nsb\_select \; SBs \text{ into } SBselect[] \subseteq SBavail[] \quad [30]$$

$$REtotal = \sum_{RE \in SB_{select}[]} RE \quad [31]$$

In Step 3 (block 406), the algorithm computes the MCS with the selected SBs and determines the TB size for each codeword, as follows:

- For each codeword (cw=0, 1):
  - For each modulation, compute Rsum with the selected SBs:
    - $Rsum[mod][cw] = \sum_{sb \in SB_{select}[]} R[sb][mod][cw]$
  - Use Rsum[mod][cw] and Nsb_select to determine highest possible MCS[cw]
  - TBsize [cw] = TBS_table[MCS[cw]][Nsb_select]
- End For Next, a determination is made at block 408 whether to increase the number of SBs. In particular, the TB size for each codeword has to be no smaller than the original TB size.

If it is determined that it is needed to increase the number of SBs, then in Step 4 (block 410), the following operations may be performed:

- For each codeword:
  - Set Nsb_select[cw] = Nsb_select
  - Set SBselect[ ][cw] = SBselect[ ]
  - While (TBsize [cw] < Ndata[cw]) AND (allowAddSbs[cw] == TRUE)
    - Set allowRemoveSbs = FALSE
    - if (Nsb_select[cw] < Nsb_avail)
      - Add a minimal unit of SBs from SBavail[ ] into SBselect[ ][cw] and set Nsb_select[cw] accordingly
      - TBsize [cw] = TBS_table[MCS[cw]][Nsb_select[cw]]
    - Else
      - Set allowAddSbs[cw] = False
      - This codeword is not to be scheduled for data retransmission, set Nsb_select[cw] = 0 and SBselect[ ][cw] as an empty set.
    - End if
  - End while
- End For Set Nsb_select=max(Nsb_select[0], Nsb_select[1])
Set SBselect[ ] to SBselect[ ][cw] with size equal to Nsb_select
Update REtotal if SBselect[ ] is increased If it is determined at block 412 that the number of SBs should be reduced, then in Step 5 (block 414), over-allocated SBs are removed. Removal of SBs may be performed as follows:

- While (TBsize [0] > αNdata[0]) AND (TBsize [1] > αNdata[1]) AND (allowRemoveSbs == TRUE)
  - If Nsb_select > minimal unit of SBs
    - Include smallest unit of SB(s) from SBselect[ ] to get Nsbs_temp < Nsb select
    - For each codeword (cw = 0, 1)
      - TBsize_temp [cw] = TBS_table[MCS[cw]][Nsbs_temp]
      - If TBsize_temp [cw] < Ndata[cw]
        - Set allowRemoveSbs = False
    - End For
    - If (allowRemoveSbs == TRUE)
      - Remove the SBs from SBselect[ ]
      - Nsb_select = Nsbs_temp
      - Update REtotal by removing REs belonging to the SBs
      - For each codeword (cw = 0, 1)
        - TBsize [cw] = TBsize_temp [cw]
    - End if
  - Else
    - Set allowRemoveSbs = False
  - End if
- End while Optionally, in Step 6 (block 416), the MCS[cw] may be reduced, which may lower modulation. Finally, the first and second codewords are transmitted over different MIMO layers (block 418).

Since Ndata[cw] for each codeword is already fixed, the coding rate will be adjusted with Nsb_select and the modulation that is associated with the MCS[cw]. This additional procedure may be done if a possible lower modulation leads an obvious better performance. Lowering the MCS may be done as follows:

- For each codeword:
  - If (TBsize [cw] > Ndata[cw])
    - Reduce MCS[cw] till find the lowest MCS[cw] that meets
    - TBsize [cw] >= Ndata[cw]
  - End If
- End For Outputs from the link adaptation for data retransmission are:

[1] A set of SBs selected for downlink data allocation: SBselect[ ].

[2] An MCS to be used for each codeword: MCS[0] and MCS[1] with an indication if codeword cannot be scheduled.

[3] The total number of REs (REtotal) to be used for the data transmission.

In Step 4 (block 410) and Step 5 (block 414), to reduce the search loops, it is also possible use one of the following options to calculate Nsbs_select if multiple steps are foreseen:

Option F1:
SB0=(Ndata[0]−TBsize [0])/Bt1[MCS[0]]
SB1=(Ndata[1]−TBsize [1])/Bt1[MCS[1]]
SB_Inc=max{SB0, SB1}
Nsbs select=Nsbs_pre+ceil{SB_Inc/SB_step}*SB_step
Where Nsbs_pre is the number of SBs used for the previous transmission.
Option F2:
SB_Inc=max{Ndata[0]/TBsize [0], Ndata[1]/TBsize [1]}
Nsbs_select=ceiling{Nsbs pre*SB_Inc/SB_step)}*SB_step
Option F3:
SB_Inc=max{Ndata[0]/[MCS[0]], Ndata[1]/Bt1[MCS[1]]}
Nsbs_select=ceiling{SB_Inc/SB_step)}*SB_step
Option F4:
Nsbs_select may be calculated as the maximum value from the different combinations of option 1, 2, and 3.
Option F5:
Use one of the above options to estimate Nsbs_select first, and then use the iterative method described in Step 4 (block 410) and Step 5 (block 414) to refine the result.

For link adaptation for two-codeword retransmission, the systems/methods described above can reduce the computation efforts by making use of information from the previous transmission as a starting point. In addition, with awareness that the two codewords share the same set of SBs during the link adaptation procedure, SB adjustments stay on the same direction, so potential wasted effort can be avoided.

Figure 8:
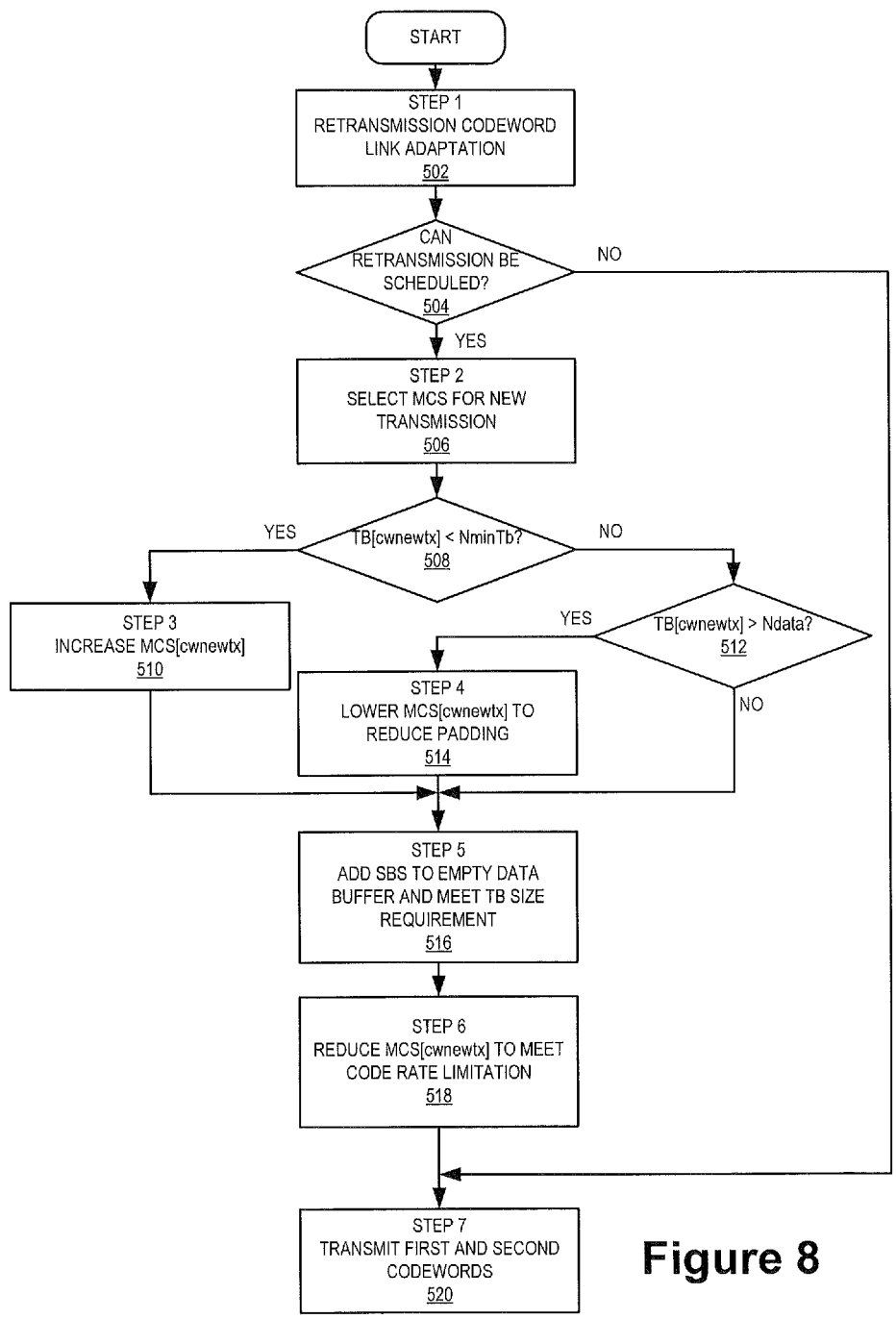

Systems/methods for performing two-codeword link adaptation for a mixture of retransmission and new transmission based on different channel conditions for each codeword are illustrated in FIG. 8.

If there is one transport block needs to be retransmitted, the eNodeB scheduler sets it at one codeword (cwretx) and schedules a new transport block on the other codeword (cwnewtx) if there is data at the eNodeB data buffer waiting for new transmission.

Systems/methods for performing link adaptation in this circumstance are illustrated in FIG. 8. As shown therein, in Step 1 (block 502), link adaptation is performed for the block needing retransmission. A codeword with a better channel condition is preferred for the retransmission. This has the advantages that it may give a better chance to cover retransmission TB sizes with available SBs, it may reduce or minimize retransmission ripple effect as the new codeword TB size is no bigger than the retransmission, and/or it may simplify the new codeword link adaptation procedure with the determined SBs, and the upper boundary handling can be skipped.

Single codeword link adaptation is used for the retransmitted codeword. The procedure exits if the retransmission link adaptation result indicates that the retransmission cannot be scheduled (block 504).

Once a codeword for retransmission is chosen, a swap flag may be set accordingly. After a successful retransmission link adaptation, SBselect[ ] is determined. Then link adaptation on new data transmission on the other codeword is performed follows.

In Step 2 (block 506), the MCS is computed with the selected SBs, and the TB size is determined for the codeword used for new transmission (cwnewtx). This may be done as follows:

- For each modulation, Rsum[mod][cwnewtx] =
$$\sum_{sb \in SB_{select[]}} R[sb][mod][cw_{newtx}]$$
  - Use Rsum[mod][cwnewtx] and Nsb_select to determine highest possible MCS[cwnewtx]
  - TBsize [cwnewtx] = TBS_table[MCS[cwnewtx]][Nsb_select]

Optionally, it may be desirable to try to empty the data buffer by adding SBs after selecting the MCS, in a similar manner as described above. Once the number of SBs is increased due to accommodating the new data transmission, the coding rate may be reduced for that codeword.

A check is then made at block 508 to see if TBsize [cwnewtx])<NminTb.

If so, then at Step 4, the MCS is increased to meet NminTb, as follows

- If (TBsize [cwnewtx]) < NminTb), then:
  - Increase MCS[cwnewtx] until the lowest possible one to meet the condition (TBsize[cwnewtx]) >= NminTb with Nsb_select and adjusted MCS[cwnewtx]

If no MCS[CWnewtx] can be found to meet the condition, this codeword will not be scheduled for new data transmission. In this case, a single-codeword retransmission algorithm may be used by the resource scheduler depending on applied transmission mode.

Otherwise, if (TBsize [cwnewtx])>Ndata) (block 512), then in Step 4, data padding is reduced/minimized by reducing MCS[cwnewtx] (block 514). In particular, MCS[1] is reduced until the lowest MCS[cwnewtx] that meets both conditions below is found:

$$TBsize[cwnewtx] >= NminTb \text{ with } Nsb\_select \text{ and adjusted } MCS[cwnewtx]; \quad [32]$$

$$TBsize[cwnewtx] >= Ndata. \quad [33]$$

Next, in Step 5, an attempt is made to empty the data buffer and meet minimal TB size requirements by adding SBs (block 516). If SBs cannot be added, MCS[cwnewtx] may be increased to meet a minimal TB size requirement.

In Step 6: code rate limitations may be met by reducing MCS[cwnewtx] (block 518). If TBsize [cwnewtx] exceeds the coding rate limitation, the MCS for this codeword may reduced until the limitation is met; otherwise the codeword may not be scheduled for data transmission. Finally, the first and second codewords are transmitted over different MIMO layers (block 520).

Outputs from the link adaptation for new data transmission are:

[1] A set of SBs selected for DL data allocation (SBselect[ ]).

[2] A transport block size (TBsize[cw]) for the new transmission codeword only. If no data can be scheduled for that codeword, the related size=0.

[3] An MCS used for each codeword (MCS[0] and MCS[1]) with indication if codeword can't be scheduled.

[4] A total number of REs (REtotal) to be used for the data transmission.

For link adaptation on two-codeword mixed with retransmission and new transmission, the systems/methods described above can provide a codeword arrangement that is in favor of terminating retransmission by choosing a codeword with a better channel quality. Link adaptation for the codeword on new transmission may also be simplified, as there may be no SB size adjustment. Moreover, there may be no upper bound condition checking as the TB size for new transmission is not larger than the TB size for retransmission.

In multi user MIMO (MU-MIMO), multiple UEs can share the same time and frequency resources if their data transmissions are uncorrelated. Transmission modes for MU-MIMO include transmission mode TM5, and transmission modes TM8 and TM9 with beamforming technologies. If it is desired to schedule multiple UEs using the exact same time and frequency resources, the link adaptations described herein can be extended for these transmission modes. An extension of the link adaptation systems/methods described herein for transmission mode TM5 is described below. However, the other transmission modes may be used in a similar manner.

In transmission mode 5, two parallel data streams are transmitted simultaneously by an eNodeB 122-1 to two UEs 110-1, 110-2 (FIG. 1) using the same time-frequency resources. The eNodeB 122-1 selects the precoding matrix such that each data stream is transmitted to the corresponding UE with maximum throughput and the interference between data streams is minimized. Once two UEs are paired for co-scheduling and share same set of SBs, some part of the link adaptation algorithms discussed herein can be used.

In some embodiments, single codeword link adaptation could be performed for each UE independently. In order to empty the buffers for all the UEs being co-scheduled, the largest number of SBs required among all of them could be selected as the desired Nsb_select. Then the MCSs and TBSs could be determined for other UEs with the desired Nsb_select using the 3GPP table.

Alternatively, it would be possible to try to empty data buffer of the UE using the largest number of SBs. In this case, link adaptation would be performed only on the UE with the largest initial estimated number of SBs required to obtain the desired Nsb_select, which would be used to determine the MCSs and TBSs for other UEs being co-scheduled. The desired Nsb_select could be increased if the buffers of some UEs could not be emptied by using the similar methods described as described above with respect to block 312 of FIG. 6.

In yet another alternative, it would be possible to try to empty data buffer of the UE using the smallest number of SBs. In this case, link adaptation would be performed only on the UE with the smallest initial estimated number of SBs required to obtain the desired Nsb_select, which would be used to decide the MCSs and TB Ss for other UEs being co-scheduled. If the Nsb_select is too small for even the minimal TB size of the other UE, Nsb_select could be increased for accommodating the minimal TB size or that UE could simply be blocked without further SB searching. This option makes sure that all codewords are fully used, but makes it more possible that additional grants will be required later on for UEs that have not received all data transmitted.

Figure 9:
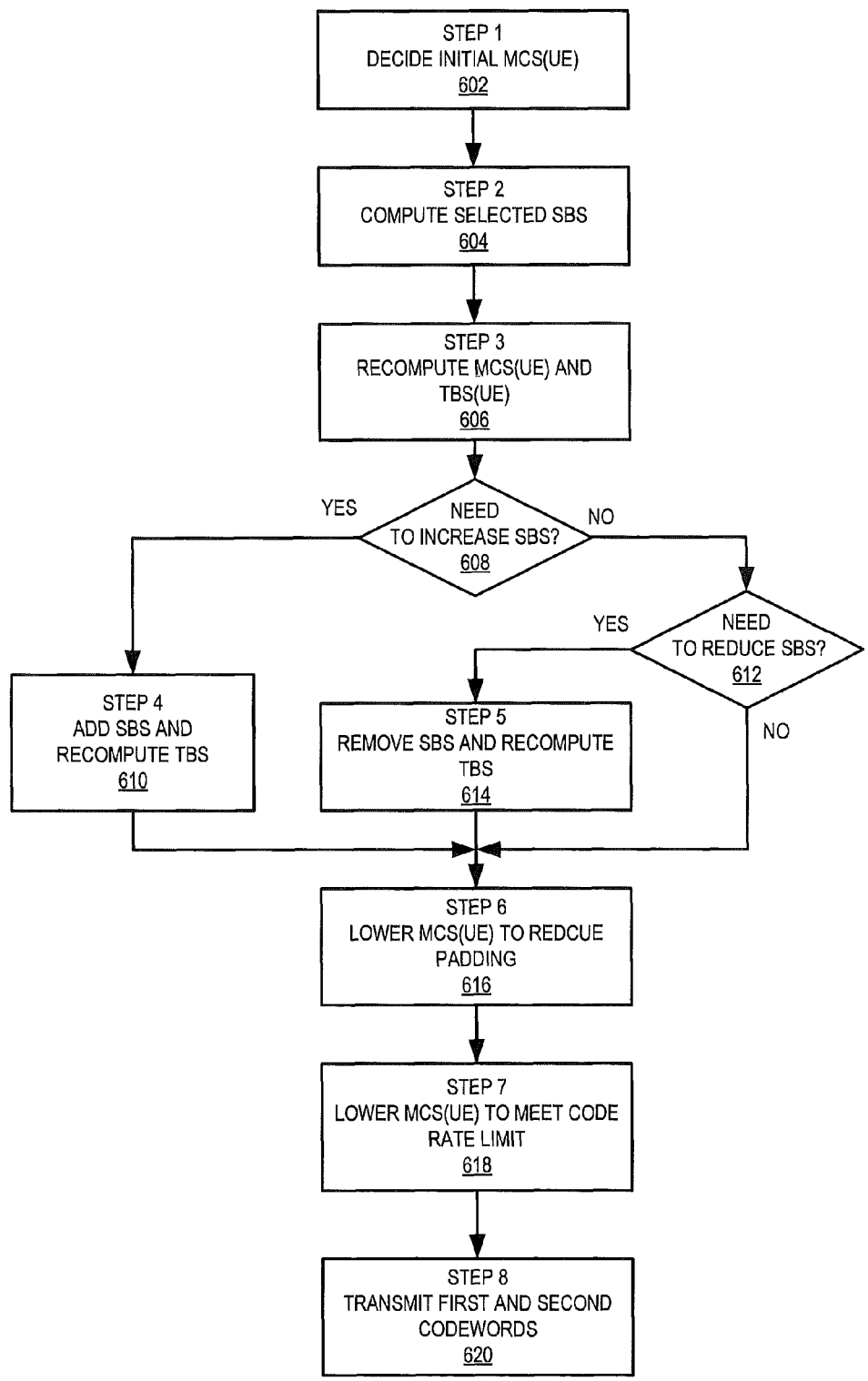

MU-MIMO link adaptation for new data transmission according to some embodiments is illustrated in FIG. 9, which illustrates co-scheduling for the paired UEs.

As shown therein, in Step 1 (block 602), an initial MCSinit [ue] is selected for each UE.

In Step 2 (block 604) common selected SBs are computed for the paired UEs. To accomplish this, MCSinit [ue] and Ndata[ue] may be used to determine which SBs are to be included in SBselect[ue], where SBselect[ue] $\subseteq$ SBavail[ ], as follows:

Take the larger set SBs as SBselect[] $\subseteq$ SBavail[]

Set Nsb_select = number of SBs within SBselect[]

Set $REtotal = \sum_{RE \in SB_{select}[]} RE$

In Step 3 (block 606), the MCS for each UE is recomputed with the newly selected SBs and the TB size for each UE is determined. This may be accomplished as follows:

☐ For each UE:
  • For each modulation, recompute Rsum with the new set of selected SBs
    ♦ $Rsum[mod][ue] = \sum_{sb \in SB_{select}[]} R[sb][mod][ue]$
  • Use Rsum[mod][ue] and Nsb_select to determine highest possible MCS[ue]
  • Set TBsize [ue] = TBS_table[MCS[ue]][Nsb_select]
  • If TBsize [ue] = NmaxTb, then:
    ♦ Reduce MCS[ue]
    ♦ TBsize [ue] = TBS_table[MCS[ue]][Nsb_select] until TBsize [ue] <= NmaxTb
  • End If
☐ End For At block 606 a check is made if there is a need to increase the number of SBs, while at block 612, a check is made to see if there is a need to reduce the number of SBs. The SB adjustment is only in one direction (i.e., either increasing or decreasing), so either set allowAddSbs=TRUE or set allowRemoveSbs=TRUE depending on the results of the decision blocks 608 and 612.

If it is determined at block 608 that there is a need to increase the number of SBs, then operations proceed to Step 4 (block 610), and an attempt is made to try to empty the data buffer and meet the minimal TB size requirement by adding SBs. If it is not possible to add SBs, MCS[ue] may be increased to meet the minimal TB size requirement, as follows:

```
While (min (TBsize [ue], ue=0, 1)< NminTb) OR (either
   TBsize [ue] < Ndata[ue], ue = 0, 1)) AND
   (allowAddSbs == TRUE)
  • Set allowRemoveSbs = FALSE (for blocking step 6)
  • If Nsb_selected < Nsb_avail
     ♦ Include additional smallest unit of SB(s)
        into SBselect[ ] from SBavail[ ] to
        get Nsbs_temp > Nsb_select
     ♦ For UE that TBsize [ue] <= Ndata[ue]
        ○ TBsize_temp [ue] =
           TBS_table[MCS[ue]][ Nsbs
           temp]
        ○ If TBsize temp [ue] > NmaxTb
           ■ Set allowAddSbs =
              False
     ♦ End For
     ♦ If allowAddSbs == TRUE
        ○ Add the SBs in SBselect[ ]
        ○ Nsb_select = Nsbs_temp
        ○ Update REtotal by adding REs
           belonging to the SBs
        ○ For each UE
           ■ TBsize [ue] =
              TBsize_temp [ue]
     ♦ End If
  • Else
     ♦ Set allowAddSbs = False
     ♦ For UE, if TBsize [ue] < NminTb
        ○ Increase MCS[ue] till the lowest
           possible one to meet
           TBsize[ue] >= NminTb
        ○ If no MCS[ue] can be found to
           make TBsize [ue] >= NminTb,
           this UE is not to be scheduled
           for data transmission.
     ♦ End For
  • End if
End while
```

In Step 4 (block 610), to reduce the search loops, it is possible to use the formula below to calculate Nsbs_temp.

Nsb_temp=ceil (Nsb_select x max(Ndata[ue]/(TBsize [ue], ue=0, 1)) to closest SB allocation units while Nsb_temp<=Nsb_avail.

If it is determined in decision block 612 that the number of SBs should be reduced, operations proceed to Step 5 (block 614), in which over-allocated SBs are removed, as follows:

```
While (both TBsize [ue] > αNdata[ue], ue = 0, 1) AND
   (allowRemoveSbs == TRUE)
  • If Nsb select > minimal unit of SBs
     ♦ Exclude smallest unit of SB(s) from SBselect[ ] to get
        Nsbs_temp < Nsb select
     ♦ For each UE
        ○ TBsize_temp [ue] = TBS_table[MCS[ue]][
           Nsbs_temp]
        ○ If TBsize_temp [ue] < NminTb
           ■ Set allowRemoveSbs = False
     ♦ End For
     ♦ If (allowRemoveSbs == TRUE) AND (both TBsize
        [ue] >= Ndata[ue], ue = 0, 1)
        ○ Remove the SBs from SBselect[ ]
        ○ Nsb_select = Nsbs_temp
        ○ Update REtotal by removing REs belonging
           to the SBs
        ○ For each UE:
           ■ TBsize [ue] = TBsize_temp [ue]
     ♦ End If
  • Else
     ♦ Set allowRemoveSbs = False
  • End if
End while
```

In Step 5, to reduce the search loops, the formulas described in Step 3 can also be used to calculate Nsbs_temp.

Nsb_temp=ceil (Nsb_select x max(Ndata[ue]/(TBsize [ue], ue=0, 1)) to closest SB allocation units while Nsb_temp=>minimal unit of SBs.

After SB adjustment in blocks 610 or 612, operations proceed to Step 6 (block 616), in which data padding is reduced by reducing MCS[ue], as follows:

```
For each UE, if TBsize [ue] > Ndata[ue]
  • Reduce MCS[ue] until the lowest MCS[ue] is found that meets
     both conditions below:
     ♦ TBsize [ue] >= NminTb with Nsb_select and adjusted
        MCS[ue];
     ♦ TBsize [ue] >= Ndata[ue]
End For
```

At Step 7 (block 618), code rate limitations may be met by reducing MCS[ue]. In this operation, for each UE, if the TBsize[ue] exceeds the coding rate limitation, the MCS for the UE is reduced until the limitation is met, or the UE is not scheduled for data transmission. Finally, the first and second codewords are transmitted over different MIMO layers (block 620).

Outputs from the link adaptation for new data transmission are:

[1] A set of SBs selected for PDSCH resource allocation: SBselect[ ]

[2] The transport block size for each UE: TBsize [ue]. If no data can be scheduled for a UE, the related size=0

[3] The MCS used for each UE: MCS[ue] with indication if UE(s) can be scheduled.

[4] The total REs (REtotal) to be used for the data transmission

For a mix of retransmission and new transmission, once paired UEs are selected, MU-MIMO for multiple UE retransmissions or mix of retransmission and new transmission can use the same algorithms for two codewords for single UE as described in sections above.

If multiple UEs can be co-scheduled to share time and frequency resources for UL data transmission, the link adaptation algorithms discussed above with respect to downlink transmission can be adopted, as well.

The systems/methods described herein can be used for MU-MIMO link adaptation for new data transmissions by multiple UEs, retransmissions and mix of data retransmission and new transmission.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention, as set forth in the following claims.

What is claimed is:

1. A method of performing link adaptation in a wireless communication system for simultaneous transmission of first and second codewords over multiple input multiple output (NEMO) communication channels, the method comprising:
    selecting initial modulation and coding scheme (MCS) levels for the first and second codewords;
    estimating a size ratio of the first and second codewords;
    determining a number of scheduling blocks for the first and second codewords with the initial modulation and coding schemes;
    determining revised MCS levels for the first and second codewords in response to the determined number of scheduling blocks;
    computing transport block sizes for the first and second codewords in response to the revised MCS levels for the first and second codewords;
    determining if there is a need to increase the number of scheduling blocks in at least one codeword of the first and second codewords;
    adding scheduling blocks to the at least one codeword in response to determining that there is a need to increase the number of scheduling blocks in the at least one codeword;
    re-computing the transport block size for the at least one codeword;
    determining if there is a need to reduce the number of scheduling blocks in at least another of the first and second codewords;
    removing scheduling blocks from the at least another codeword in response to that there is a need to reduce the number of scheduling blocks,in the at least another codeword;
    re-computing the transport block for the at least another codeword; and
    simultaneously transmitting the first and second codewords over different MIMO communication channels using the same time and frequency resources.

2. The method of claim 1, wherein estimating the size ratio for the first and second codewords comprises estimating a predicted throughput for each scheduling block and estimating data sizes for the first and second codewords in response to the predicted throughput for each scheduling block.

3. The method of claim 2, wherein estimating the predicted throughput for each scheduling block comprises determining an average number of bits per scheduling block based on channel quality measurements.

4. The method of claim 1, wherein determining if there is a need to increase the number of scheduling blocks in at least one of the codewords comprises comparing a sum of transport block sizes for the first and second codewords to a total size of data to be transmitted.

5. The method of claim 1, further comprising:
    lowering the MCS levels for at least one of the codewords to reduce padding in the transport blocks.

6. The method of claim 1, further comprising:
lowering the MCS levels for at least one of the codewords to meet a code rate limit.

7. The method of claim 1, wherein determining if there is a need to reduce the number of scheduling blocks in at least one of the codewords comprises comparing a sum of transport block sizes for the first and second codewords to a padded size of data to be transmitted.

8. The method of claim 1, wherein selecting the initial MCS levels for the first and second codewords comprises:
determining an aggregate channel quality measurement for each codeword and modulation scheme for an entire bandwidth of available scheduling blocks; and
determining a highest possible MCS level for each codeword in response to the aggregate channel quality measurement.

9. The method of claim 1, wherein selecting the initial MCS levels for the first and second codewords comprises:
selecting an initial number of scheduling blocks that is a minimum number based on downlink control information;
generating an aggregate channel quality measurement as a sum of channel quality measurements for the selected scheduling blocks; and
determining a highest possible MCS level for each codeword in response to the aggregate channel quality measurement.

10. The method of claim 1, further comprising checking a time budget for link adaptation, wherein in response to checking the time budget for link adaptation, determining the revised MCS levels comprises emptying a data buffer without checking a channel quality for the first codeword.

11. The method of claim 10, further comprising checking a time budget for link adaptation, wherein in response to checking the time budget for link adaptation, determining the revised MCS levels comprises emptying a data buffer without checking a channel quality for the first codeword and with checking a channel quality for the second codeword.

12. The method of claim 1, further comprising checking a time budget for link adaptation, wherein in response to checking the time budget for link adaptation, determining the revised MCS levels comprises checking channel quality for the first and second codewords without emptying a data buffer.

13. A method of performing link adaptation in a wireless communication system for simultaneous retransmission of first and second codewords over first and second multiple input-multiple output (MIMO) communication channels, the method comprising:
determining transport block sizes for the first and second codewords used in an initial transmission of the first and second codewords;
mapping the codeword with the larger transport block size to a MIMO communication channel of the first and second MIMO communication channels having the higher channel quality;
selecting scheduling blocks for the first and second codewords;
determining modulation and coding scheme (MCS) levels for retransmission of the first and second codewords;
determining transport block sizes for retransmission of the first and second codewords;
determining if there is a need to increase the number of scheduling blocks in at least one codeword of the first and second codewords;
adding scheduling blocks to the at least one codeword in response to determining that there is a need to increase the number of scheduling blocks in the at least one codeword;
re-computing the transport block size for the at least one codeword;
determinig if there is a need to reduce the number of scheduling blocks in at least another of the first and second codewords;
removing scheduling blocks from the at least another codeword in response to determining that there is a need to reduce the number of scheduling blocks in the at least another codeword;
re-computing the transport block for the at least another codeword; and
simultaneously transmitting the first and second codewords over different MIMO communication channels using the same time and frequency resources.

14. The method of claim 13, further comprising reducing the modulation and coding scheme level for at least one of the codewords until a lowest MCS level is found for which the transport block size is greater than the amount of data to be transmitted in the codeword.

15. A network node of a radio access network, the network node comprising:
a scheduler that is configured to:
select initial modulation and coding scheme (MCS) levels for first and second codewords;
estimate a size ratio of the first and second codewords;
determine a number of scheduling blocks for the first and second codewords with the initial modulation and coding schemes;
determine revised MCS levels for the first and second codewords in response to the selected scheduling blocks;
compute transport block sizes for the codewords in response to the revised modulation and coding schemes for the first and second codewords;
determine if there is a need to increase the number of scheduling blocks in at least one codeword of the first and second of the codewords;
add scheduling blocks to the at least one codeword in response to determining that there is a need to increase the number of scheduling blocks in the at least one codeword;
re-compute the transport block for the at least one codeword;
determine if there is a need to reduce the number of scheduling blocks in at least another of the first and second codewords;
remove scheduling blocks from the at least another codeword in response to determining that there is a need to reduce the number of scheduling blocks in the at least another codeword; and
re-compute the transport block for the at least another codeword; and
a transmitter that is configured to simultaneously transmit the first and second codewords over different multiple input —multiple output (MEMO) communication channels using the same time and frequency resources.

16. A network node of a radio access network, the network node comprising:
a scheduler that is configured to:
determine transport block sizes for first and second codewords used in an initial transmission of the first and second codewords;

map the codeword with the larger transport block size to a MIMO communication channel of the first and second MIMO communication channels having the higher channel quality;
select scheduling blocks for the first and second codewords;
determine modulation and coding scheme (MCS) levels for retransmission of the first and second codewords;
determine transport block sizes for retransmission of the first and second codewords;
determine if there is a need to increase the number of scheduling blocks in at least one codeword of the first and second codewords;
add scheduling blocks to the at least one codeword in response to determining that there is a need to increase the number of scheduling blocks in the at least one codeword; and
re-compute the transport block for the at least one codeword;
determine if there is a need to reduce the number of scheduling blocks in at least another of the first and second codewords;
remove scheduling blocks from the at least another codeword in response to determining that there is a need to reduce the number of scheduling blocks in the at least another codeword;
re-compute the transport block for the at least another codeword; and
a transmitter that is configured to simultaneously re-transmit the first and second codewords over different MINK) communication channels using the same time and frequency resources.

* * * * *

UNITED STATES PATENT AND TRADEMARK OFFICE
CERTIFICATE OF CORRECTION

PATENT NO. : 9,014,135 B2
APPLICATION NO. : 13/342650
DATED : April 21, 2015
INVENTOR(S) : Yu et al.

It is certified that error appears in the above-identified patent and that said Letters Patent is hereby corrected as shown below:

On Page 2, item (56), under "OTHER PUBLICATIONS", in Column 2, Line 22, delete "Sevilla, Spain," and insert -- Seville, Spain, --, therefor.

In the specification

In Column 10, Line 29, delete "144-x" and insert -- 142-x --, therefor.

In Column 14, Line 22, in Equation (8), delete " $(N_{data} \times B_t[0]/(B_t[0]+B_t[1]), N_{maxTb})$ " and insert -- $(N_{data} \times B_t[0]/(B_t[0] + B_t[1]), N_{maxTb})$ --, therefor.

In Column 14, Line 45, delete "[cw])" and insert -- [cw] --, therefor.

In Column 16, Line 67, delete "$N_{sbs\ temp}$." and insert -- $N_{sbs\_temp}$. --, therefor.

In Column 17, Line 36, delete "N_SBS_1:" and insert -- N_SBS_2: --, therefor.

In Column 20, Line 13, delete "exceeded" and insert -- exceeded. --, therefor.

In the claims

In Column 32, Line 17, in Claim 1, delete "(NEMO)" and insert -- (MIMO) --, therefor.

In Column 32, Line 43, in Claim 1, delete "that" and insert -- determining that --, therefor.

In Column 32, Line 44, in Claim 1, delete "blocks,in" and insert -- blocks in --, therefor.

In Column 33, Line 34, in Claim 11, delete "claim 10," and insert -- claim 1, --, therefor.

Signed and Sealed this
Thirteenth Day of October, 2015

Michelle K. Lee
*Director of the United States Patent and Trademark Office*

CERTIFICATE OF CORRECTION (continued)
U.S. Pat. No. 9,014,135 B2

In Column 34, Line 7, in Claim 13, delete "determinig" and insert -- determining --, therefor.

In Column 34, Line 60, in Claim 15, delete "(MEMO)" and insert -- (MIMO) --, therefor.

In Column 35, Line 30, in Claim 16, delete "MINK)" and insert -- MIMO --, therefor.